(12) United States Patent (10) Patent No.: US 8,396,046 B2
Nagasawa et al. (45) Date of Patent: *Mar. 12, 2013

(54) COMMUNICATION APPARATUS AND COMMUNICATION CONTROL METHOD

(75) Inventors: Chizuko Nagasawa, Yokohama (JP); Kugo Morita, Yokohama (JP)

(73) Assignee: Kyocera Corporation, Kyoto (JP)

( * ) Notice: Subject to any disclaimer, the term of this patent is extended or adjusted under 35 U.S.C. 154(b) by 330 days.

This patent is subject to a terminal disclaimer.

(21) Appl. No.: 12/675,745

(22) PCT Filed: Aug. 27, 2008

(86) PCT No.: PCT/JP2008/065292
§ 371 (c)(1),
(2), (4) Date: Jul. 8, 2010

(87) PCT Pub. No.: WO2009/028546

PCT Pub. Date: Mar. 5, 2009

(65) Prior Publication Data

US 2010/0296442 A1 Nov. 25, 2010

(30) Foreign Application Priority Data

Aug. 29, 2007 (JP) ................................. 2007-222816

(51) Int. Cl.
*H04W 4/00* (2009.01)
(52) U.S. Cl. ..................................................... 370/338
(58) Field of Classification Search .................. None
See application file for complete search history.

(56) References Cited

U.S. PATENT DOCUMENTS

| 7,818,002 B2* | 10/2010 | Bajko et al. ................ 455/435.1 |
| 2002/0165966 A1 | 11/2002 | Widegren et al. |
| 2003/0074452 A1 | 4/2003 | Zheng et al. |
| 2003/0108000 A1* | 6/2003 | Chaney et al. ............... 370/260 |
| 2004/0005886 A1* | 1/2004 | Oda et al. ................... 455/422.1 |
| 2004/0015589 A1 | 1/2004 | Isozu |

(Continued)

FOREIGN PATENT DOCUMENTS

| JP | 2005-136553 | 5/2005 |
| JP | 2007-006102 | 1/2007 |

(Continued)

OTHER PUBLICATIONS

Office Action from Korean Patent Application No. 10-2010-7004538, mailed on May 29, 2011.

(Continued)

*Primary Examiner* — Anh-Vu Ly
(74) *Attorney, Agent, or Firm* — Duane Morris LLP

(57) ABSTRACT

An origination terminal UA100 according to the present invention is provided with a screen state memory unit 500 for storing a screen state of an information display unit 360 at transmission of a call request including information on communication on a desired network and an initiation state of an application corresponding to the screen state and a control unit 320 for controlling the information display unit 360, when receiving a call enable notification in response to a call enable notification request transmitted after cancellation of a call from a destination terminal UA200, which becomes able to use the desired network, to display the screen state stored in the screen state memory unit 500 and, when detecting a call instruction in the screen state, an application corresponding to the call instruction to send a call.

4 Claims, 33 Drawing Sheets

U.S. PATENT DOCUMENTS

| | | | |
|---|---|---|---|
| 2004/0132438 A1* | 7/2004 | White | 455/418 |
| 2004/0148352 A1 | 7/2004 | Menon et al. | |
| 2004/0156364 A1 | 8/2004 | Kawaguchi et al. | |
| 2004/0240652 A1 | 12/2004 | Kanada | |
| 2007/0217349 A1 | 9/2007 | Fodor et al. | |
| 2008/0009325 A1* | 1/2008 | Zinn et al. | 455/566 |
| 2008/0076420 A1* | 3/2008 | Khetawat et al. | 455/435.1 |

FOREIGN PATENT DOCUMENTS

| | | |
|---|---|---|
| JP | 2007-019725 | 1/2007 |
| JP | 2007-531423 | 4/2007 |
| WO | WO-2006/082861 | 8/2006 |
| WO | WO-2007-043180 | 4/2007 |

OTHER PUBLICATIONS

International Search Report for PCT/JP2008/065292, mailed on Nov. 11, 2008, 1 page.

Rosenberg et al., SIP: Session Initiation Protocol, RFC 3261, Jun. 2002, retrieved from http://www.ietf.org/rfc/rfc3261.txt.

Office Action from Chinese Patent Application no. 200880113233.5, mailed on May 2, 2012 and its English translation (Seven Pages).

CN200880102414.8 Chinese Office Action mailed Jun 30, 2012.

KR10-2010-7002846 Korean Office Action mailed Apr. 28, 2011.

PCT/JP2008/064302 International Search Report mailed Oct. 14, 2008.

* cited by examiner

FIG. 7

| NUMBER | ADDRESS | REGISTERED NETWORK |
|---:|:---:|:---:|
| 9500 | 111.111.111.111 | IEEE806.16e |
| 8000 | 123.123.123.123 | EVDO |
| 7000 | 222.222.222.222 | WLAN |
| ⋮ | ⋮ | ⋮ |

FIG. 11

```
Contact-Type:application/IP-TV-info+xml          <-- NAME OF APPLICATION TO BE USED
b="? AS:500"                                     <-- BANDWIDTH REQUIRED FOR APPLICATION Media-Name:IEEE802.16e
Media-Name:EV-DO
Required:Media-Name:IEEE802.16e;EV-DO;CDMA-1X;WLAN   <-- NETWORK TO WHICH TERMINAL OF CALLING SIDE CAN CONNECT Media-Pref:IEEE802.16e
Required:Media-Pref:IEEE802.16e;EV-DO;CDMA-1X;WLAN   <-- WIRELESS NETWORK DESIRED BY CALLING SIDE Com-Media-Sel-Pref:bandwidth                     <-- EXTENDED FUNCTION OF DESIRED CONDITION ON SELECTION OF WIRELESS NETWORK AT CALLED SIDE
Required:Com-Media-Sel-Pref:bandwidth;billing    <-- NOTIFY EXTENSION HEADER AND OPTION TAG
```

| ORIGINATION NUMBER | DESTINATION NUMBER | WIRELESS NETWORK DESIRED BY ORIGINATOR |
|---|---|---|
| 9500 | 9800 | IEEE806.16e |
| 8000 | 8100 | EVDO |
| 7000 | 7200 | WLAN |
| ⋮ | ⋮ | ⋮ |

CONTENTS OF
NOTIFICATION REQUEST 1/2

ADDRESSED TO: TARO YAMADA (9000)

APPLICATION TO USE: VIDEOPHONE

DESIRED NETWORK: IEEE802.16e

OK   CANCEL (b)

CONTENTS OF
NOTIFICATION REQUEST 2/2

VALID DURATION:
○ 1h    ○ 12h
◉ 24h   ○ [    ] h

MESSAGE:
○ NOT IMPORTANT
◉ WISH TO CALL WITH HIGH-
   QUALITY VIDEOPHONE
○ [              ]

RETURN   OK   CANCEL

FIG. 17

```
MESSAGE sip:9000@sipserver.jp SIP/2.0
Via: SIP/2.0/UDP 172.17.1.50:5060;branch=z9hG4bK3495ebdc
Max-Forwards: 70
From: 9500@sipserver.jp;tag=1448274908
Call-ID:slaiji19083-ejlaiorfasjssdfowe789sdf0qs98dsdf09sdffs8909000
Cseq:1 MESSAGE
Allow: INVITE, ACK, CANCEL, BYE, OPTIONS, REGISTER, MESSAGE, SUBSCRIBER, NOTIFY
Content-Type: text/plain
Content-Length:

Message-Type: report-request
Send-Time: 2007/01/01 01:20:25
Request-ID: 12345
Caller-NW: IEEE802.16e
Receiver-NW: IEEE802.16e
Valid Duration: 24h
Application: video-phone
Bandwidth: 5000000bps
Message :"WISH TO CALL WITH HIGH-QUALITY VIDEOPHONE"
```

```
┌──────────────────────────────────┐
│   AUTOMATIC RESPONSE SETTING FOR │
│  CONNECTION NOTIFICATION(SILENT MODE) │
├──────────────────────────────────┤
│   MODE         GRANT/REJECTION   │
│                                  │
│   NORMAL MODE  EACH NOTIFICATION PARTY │
│   SILENT MODE  REJECT ALL        │
│                                  │
│                                  │
│ (REJECT ALL)(EACH NOTIFICATION PARTY)(GRANT ALL) │
└──────────────────────────────────┘
```

(b)

```
┌──────────────────────────────────┐
│   AUTOMATIC RESPONSE SETTING FOR │
│      CONNECTION NOTIFICATION     │
│      (EACH NOTIFICATION PARTY)   │
├──────────────────────────────────┤
│   SET RESPONSE FOR EACH          │
│   NOTIFICATION PARTY             │
│                                  │
│  NOTIFICATION PARTY  GRANT/REJECT│
│                                  │
│   TARO YAMADA         ×          │
│   JIRO YAMADA         ×          │
│ ┌─────────────────────────────┐  │
│ │ HANAKO YAMADA        ○      │  │
│ └─────────────────────────────┘  │
│  (○ (GRANT))      (× (REJECT))   │
└──────────────────────────────────┘
```

FIG. 19

| NOTIFICATION ID | REQUEST TRANSMISSION TIME | VALID DURATION | DESTINATION | NETWORK DESIRED BY ORIGINATOR | NETWORK DESIRED BY DESTINATION | DESIRED APPLICATION | REQUIRED BANDWIDTH | MESSAGE |
|---|---|---|---|---|---|---|---|---|
| 12345 | 2007/01/01 01:20:25 | 24h | b00b@sipserver.jp | IEEE802.16e | IEEE802.16e | VIDEO PHONE | 3Mbps | WISH TO CALL WITH HIGH-QUALITY VIDEOPHONE |
| 67890 | 2007/12/30 11:45:32 | 96h | 3000@sipserver.jp | IEEE802.16e | IEEE802.16e | VIDEO PHONE | 5Mbps | WISH TO CALL WITH HIGH-QUALITY VIDEOPHONE |

FIG. 20

| REQUEST TRANSMISSION TIME | VALID DURATION | REQUEST RESPONSE TIME | ORIGINATOR | NOTIFICATION REQUEST ID | NETWORK DESIRED BY ORIGINATOR | NETWORK DESIRED BY DESTINATION | DESIRED APPLICATION | REQUIRED BANDWIDTH | MESSAGE |
|---|---|---|---|---|---|---|---|---|---|
| 2007/01/01 01:20:25 | 24h | 2007/01/01 01:50:21 | 9500@%sipserver.jp | 12345 | IEEE802.16e | IEEE802.16e | VIDEOPHONE | 5Mbps | WISH TO CALL WITH HIGH-QUALITY VIDEOPHONE |
| ... | ... | ... | ... | ... | ... | ... | ... | ... | ... |

FIG. 23

|  |  | RADIO CONDITION | | |
|---|---|---|---|---|
|  |  | 1 | 2 | 3 |
| EVDO | RSSI | WITHIN SERVICE AREA | −80dBm OR OVER | −70dBm OR OVER |
|  | SINR | WITHIN SERVICE AREA | 0 OR OVER | 5 OR OVER |
| IEEE 802.16e | RSSI | WITHIN SERVICE AREA | −90dBm OR OVER | −80dBm OR OVER |

FIG. 24

| REQUIRED BAND WIDTH | CONDITION FOR CALL ENABLE NOTIFICATION | CONDITION FOR CONDITION DETERIORATION NOTIFICATION |
|---|---|---|
| ~20kbps | OUT OF SERVICE AREA→1, 2, 3 | — |
| 20~100kbps | OUT OF SERVICE AREA, 1→2, 3 | 2→1 |
| 100kbps~ | OUT OF SERVICE AREA, 1, 2→3 | 3→2, 1 |

FIG. 28
(a) FIRST CALL
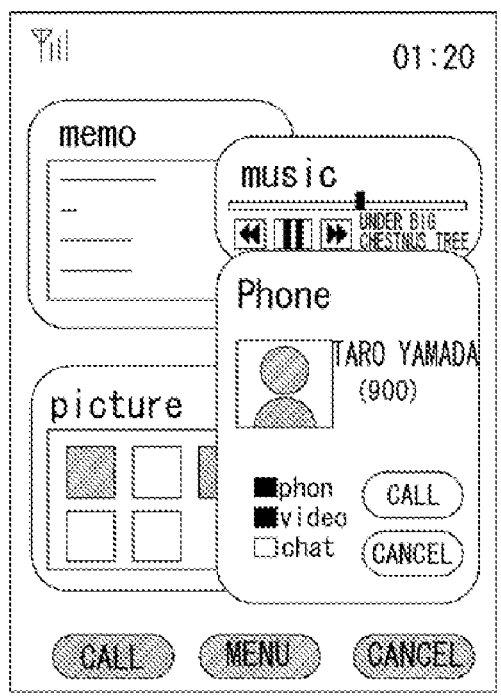
(b) SECOND CALL
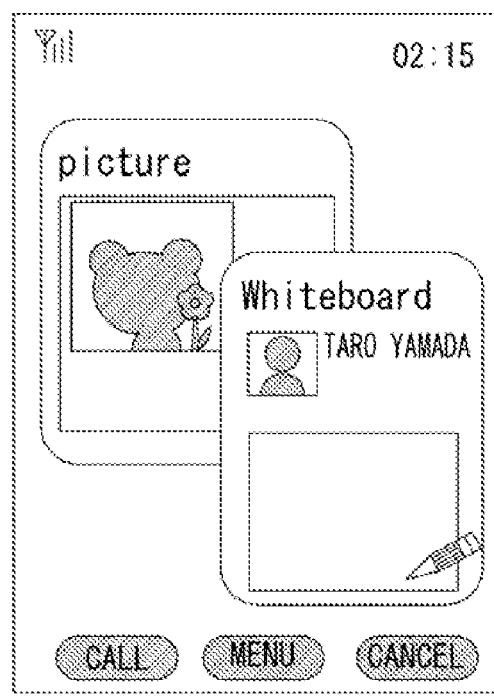

FIG. 30
(a) RE-CALL SCREEN 1
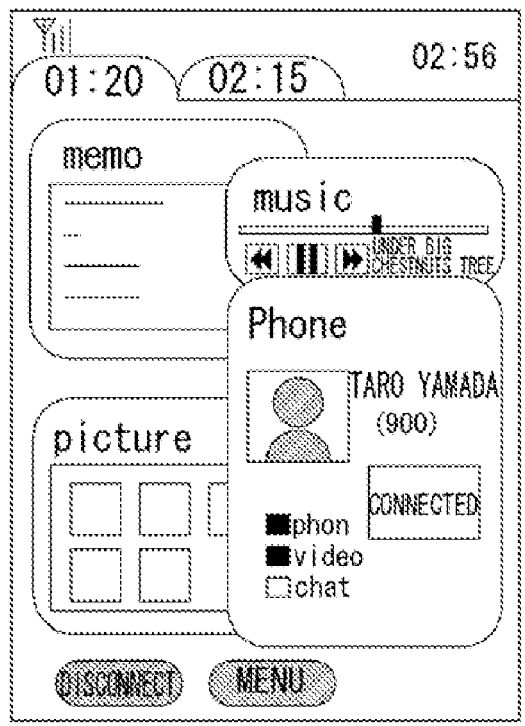
(b) RE-CALL SCREEN 2
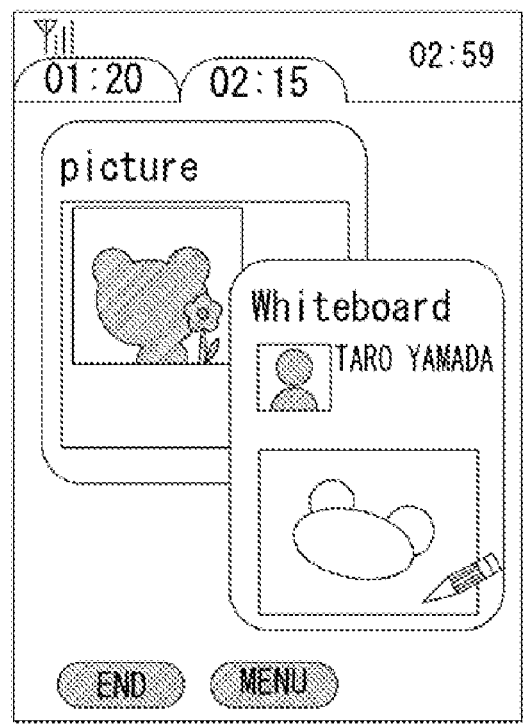

FIG. 32

| DESTINATION | DATE AND TIME | NETWORK | STATE |
|---|---|---|---|
| 9000 | 2006/10/21 22:05 | IEEE 802.16e | ×→○ |
| 9000 | 2006/10/21 22:10 | IEEE 802.16e | ○ |
| 9000 | 2006/10/21 22:15 | IEEE 802.16e | ○ |
| 9000 | 2006/10/21 22:20 | IEEE 802.16e | ○ |
| 9000 | 2006/10/21 22:40 | IEEE 802.16e | ○ |
| 9000 | 2006/10/23 21:32 | IEEE 802.16e | ○ |
| 9000 | 2006/11/1 13:30 | EVDO | ○ |
| ⋮ | ⋮ | ⋮ | ⋮ |

US 8,396,046 B2

COMMUNICATION APPARATUS AND COMMUNICATION CONTROL METHOD

CROSS REFERENCE TO RELATED APPLICATIONS

This application is a U.S. National Phase Application of International Application No. PCT/JP2008/065292, filed Aug. 27, 2008, which claims priority to and the benefit of Japanese Patent Application No. 2007-222816 filed on Aug. 29, 2007, the entire contents of which are incoporated herein by reference in their entirety.

TECHNICAL FIELD

The present invention relates to a communication apparatus and a communication control method.

BACKGROUND ART

SIP (Session Initiation Protocol) is a standard defined as one of call control protocols achieving call control such as a connection request with a real-time application of an internet phone based on VoIP (Voice over Internet Protocol). (For example, see Non-Patent Document 1.)

SIP was used originally for VoIP communication between computers such as personal computers and servers connected via a wired network on the Internet. In recent years, however, an SIP server of wireless carriers (operators) and a wireless communication terminal (apparatus) supporting SIP have been developed, us digitalization of and adoption of IP technology to wireless communication equipment has been progressed. Moreover, recent development of wireless communication technology enables a single wireless communication terminal to be provided with a plurality of wireless communication devices connectable to different wireless communication systems (wireless communication networks). Typical applications are PDA, PC and a cellular phone provided with a first wireless communication device connectable to a cellular phone network and a second wireless communication device to connect to a station of a wireless LAN such as WiFi and WiMAX, or MAN (Metropolitan Area Network).

Non-Patent Document 1: RFC3261 (a document of RFC defining SIP)

SUMMARY OF INVENTION

Technical Problem

The SIP technology, however, was originally intended for use in a wired communication network, not in a wireless communication network in which a bandwidth and the communication quality change constantly. In addition, the SIP technology was not intended for use in the wireless communication apparatus connectable to a plurality of wireless communication networks. Accordingly, the SIP technology in the wired communication network on the internet has been developed, while the SIP technology on the premise of communication environments across a plurality of different kinds of wireless networks has been underdeveloped.

FIG. 33 shows a configuration diagram of a wireless communication network of the conventional art. As shown in the figure, serving as servers or gateways are a DNS server 10, an SIP server 20, an SIP server 30, a gateway (GW) 40, an SMS server 50, an SIP server (or GW) 60, and an SIP server (or GW) 70. Wireless communication terminals UA1 and UA2 and a communication terminal (softphone) UA3 serve as communication terminals of a calling side and a called side and a softphone, respectively. Theses terminals are connected to the servers via the internet NET1, an operator packet network NET2, an operator circuit switching network NET3 and operator wireless communication packet networks RNET1, RNET2.

For example, in the configuration of the wireless communication network as shown in the figure, when the wireless communication terminal UA2 is called (instructed to connect to the packet network and to register) by an SMS (Short Message Service) message from the SMS server 50 of the circuit switching network corresponding to the operator wireless communication packet network RNET1 in response to an SIP connection request (calling: Invite) by the wireless communication terminal UA1, the wireless communication terminal UA2 performs a registration operation (Register) of SIP (Session Initiation Protocol) to the SIP server 30 via the packet switching network (in this case, RNET1) of the wireless communication network corresponding to the circuit switching network (that is, provided by the same carrier) which is called, and establishes a call by performing SIP procedures thereafter. This method is on the premise of the wireless communication terminal which can use only a single operator wireless communication packet network and a circuit switching network corresponding thereto. When the wireless communication terminal UA2, on the other hand, has a function to connect to two operator wireless communication packet networks RNET1 and RNET2 and thus has two options, as shown in FIG. 34, SIP of the conventional art (that is, the wireless communication terminal UA2 having SIP) performs SIP registration via the network (the operator wireless communication packet network RNET1, in this example) corresponding to a path through which a message including a connection request (instruction to connect to the packet network and to register) has passed, as described above, and establishes a session with a caller/calling side (Calling Party) by use of the path of the packet network. In such a method for establishing the session, a bandwidth corresponding to an application which a user at the calling side (Calling Party) desires to use or a wish or preference of the user at the calling side with regard to billing and the likes is not always reflected. That is, the preference of the user (Calling Party) who sent the connection request is not considered at all.

Even if the calling side informs the called side of the preference (condition) it desires when calling with a call establishment message (INVITE) of SIP, and the called side may select a wireless communication system as much corresponding to the condition of the calling side as possible, the calling side cannot know the wireless communication system selected by the called side until initiation of the session. In other words, it is only after establishment of the session that a terminal of the calling side can know which wireless communication network a terminal of the called side can connect to (how much bandwidth the called side can use) or which wireless communication system is actually selected by the called side. It is thus not possible before establishment of the session for the calling side to know whether the terminal of the called side satisfies the preference informed by the calling side or to what degree the called side satisfies the preference if satisfying the preference. For example, when the terminal of the called side can connect only to a wireless communication network with a bandwidth not satisfying the required bandwidth, the terminal of the calling side cannot start the communication with the optimum bandwidth and the optimum wireless communication network in consideration of a current wireless communication condition of the terminal at the called side.

For example, when the calling side is connectable to WiMAX (broadband) and EVDO (narrowband) while the called side is connectable to EVDO (narrowband), and the calling side selects broadband WiMAX by prioritizing the bandwidth over billing and makes a call, the called side can connect only to EVDO regardless of the notified condition prioritizing the bandwidth. In such a case, therefore, regardless of the use of broadband WiMAX by the calling side, the narrowband EVDO selected by the called side causes a bottleneck, leading to waste of the bandwidth of WiMAX occupied and consumed by the calling side, because only the bandwidth as much as that of EVDO can be used in the session. It is thus an inefficient usage of bandwidth and waste of power. The wireless communication apparatus, in particular, is often carried constantly changing its wireless communication condition. For connection between the wireless communication apparatuses in such a radio propagation environment constantly changing, a need exists for a development of technology that provides the wireless communication connection efficient for both the called side and the calling side by selecting optimum wireless communication systems according to the wireless communication conditions of both sides. There has thus been a problem that the wireless communication terminal of the caller/calling side (Calling Party) cannot efficiently use a plurality of connectable wireless communication systems (paths, networks and communication devices).

FIG. 34 shows that information on names of available networks, name of the network desired, name of application desired, and required bandwidth is exchanged between the communication terminal of the calling side and the communication terminal of the called side before start of communication between the terminals. However, in a case where the called side cannot use the network or the application desired by the calling side, a previous call is cancelled. Accordingly, when the call is cancelled for the reason that the network or the application that the calling side desires cannot be used, it is not possible for the calling side to know when to call next so as to communicate by use of the network and the application it desires.

It is an object of the present invention to provide a technique (apparatus and method) enabling a user to know when to call so as to connect to a called side on a desired network, as well as saving steps for the user at a time of calling again, in a case where the communication apparatus of the calling side cancels a call for a reason that the wireless communication apparatus of the called side having a plurality of wireless communication systems (device/path, network, bandwidth and the likes) as options cannot use the network desired by the calling side. According to the present invention, after receiving a call enable notification from the wireless communication apparatus of the called side since the wireless communication apparatus of the called side becomes able to use the desired network, and then calling again, the communication apparatus of the calling side returns to a screen state stored at the first call.

Solution to Problem

In order to achieve the above object, a communication apparatus according to the present invention includes: a transmission unit for transmitting a call request including information on a condition of a wireless communication system of a called side desired by a calling side by use of a predetermined communication system; a memory unit for storing a screen state of a display unit at transmission of the call request and an initiation state of an application corresponding to the screen state; a request unit for requesting the called side, when receiving information that the called side uses a wireless communication system not satisfying the condition of the wireless communication system of the called side desired by the calling side in response to the call request transmitted by the transmission unit, to transmit a call enable notification, when the called side can connect to a wireless communication system satisfying the condition of the wireless communication system of the called side desired by the calling side, to notify the calling side accordingly; and a control unit for controlling the display unit, when receiving the call enable notification from the called side in response to the request by the request unit, to display the screen state stored in the memory unit and for controlling, when detecting a call instruction in the screen state, an application corresponding to the call instruction to call.

The wireless communication apparatus according to one embodiment of the present invention is characterized in that the control unit, in a case where the memory unit stores a plurality of screen states of the display unit at transmission of the call request, controls the display unit to display all of the screen states at once and, when detecting a selection instruction selecting one of the screen states, to display only a display screen corresponding to the selection instruction and, in such a state, controls an application corresponding to the display screen to call.

The wireless communication apparatus according to another embodiment of the present invention is characterized in that the control unit, in a case where the memory unit temporarily stores a screen state of the display unit before reception of the call enable notification and an initiation state of an application corresponding to the screen state, controls the display unit to display the screen state temporarily stored in the memory unit when detecting a screen return instruction after sending the call in response to the call instruction.

In order to achieve the above object, a communication control method according to the present invention includes: a transmission step for transmitting a call request including information on a condition of a wireless communication system of a called side desired by a calling side by use of a predetermined communication system; a memory step for storing a screen state of a display unit at transmission of the call request and an initiation state of an application corresponding to the screen state; a request step for requesting the called side, when receiving information that the called side uses a wireless communication system not satisfying the condition of the wireless communication system of the called side desired by the calling side in response to the call request transmitted at the transmission step, to transmit a call enable notification, when the called side can connect to a wireless communication system satisfying the condition of the wireless communication system of the called side desired by the calling side, to notify the calling side accordingly; and a control step for controlling the display unit, when receiving the call enable notification from the called side in response to the request at the request step, to display the screen state stored at the memory step and, when detecting a call instruction in the screen state, an application corresponding to the call instruction to send a call.

Advantageous Effects on Invention

According to the present invention, in a case where a user of the calling side cancels a call for a reason that a wireless communication apparatus of the called side, which is capable of using a plurality of wireless communication systems, cannot use the desired network of the calling side, the calling side, after receiving a call enable notification from the wireless communication apparatus of the called side and calling again when the wireless communication apparatus of the called side becomes able to use the desired network, returns to a screen state stored at the first call. Therefore, it enables the user to know when to call so as to connect to the called side on the desired network and reduction in procedures of the user of the calling side when calling again.

BRIEF DESCRIPTION OF DRAWINGS

FIG. 7 is a table exemplifying a register memory table used by the SIP server for the call control, in the communication control method according to the first embodiment;

FIG. 11 is a diagram exemplifying a call request (INVITE) transmitted by the wireless communication terminal, in the communication control method according to the first embodiment;

FIGS. 16(a) and 16(b) are diagrams respectively exemplifying a user selection screen to be displayed on the wireless communication terminal of the calling side, in the communication control method according to the first embodiment;

FIG. 17 is a diagram exemplifying a call enable notification request transmitted by the wireless communication terminal of the calling side, in the communication control method according to the first embodiment;

FIGS. 18(a) and 18(b) are diagrams respectively exemplifying a user selection screen to be displayed on the wireless communication terminal of the called side, in the communication control method according to the first embodiment;

FIG. 19 is a table exemplifying a transmission information history of the call enable notification request stored in the wireless communication terminal of the calling side, in the communication control method according to the first embodiment;

FIG. 20 is a table exemplifying a reception information history of the call enable notification request stored in the wireless communication terminal of the called side, in the communication control method according to the first embodiment;

FIG. 23 is a table exemplifying a radio condition determination table used for a determination of a radio condition by the wireless communication terminal of the called side, in the communication control method according to the first embodiment;

FIG. 24 is a table exemplifying a notification determination table used for a determination whether to transmit the call enable notification by the wireless communication terminal of the called side, in the communication control method according to the first embodiment;

FIGS. 28(a) and 28(b) are diagrams respectively exemplifying screen states of the wireless communication terminal of the calling side at the first call and at a second call, in the communication control method according to the first embodiment;

FIGS. 30(a) and 30(b) are diagrams respectively exemplifying a re-call screen 1 and a re-call screen 2 used for switchover of a screen when the wireless communication terminal of the calling side calls again, in the communication control method according to the first embodiment;

FIG. 32 is a table exemplifying a record of connection state of the wireless communication terminal of the called side used for creation of the graph in FIG. 31;

DESCRIPTION OF EMBODIMENTS

Figure 1:
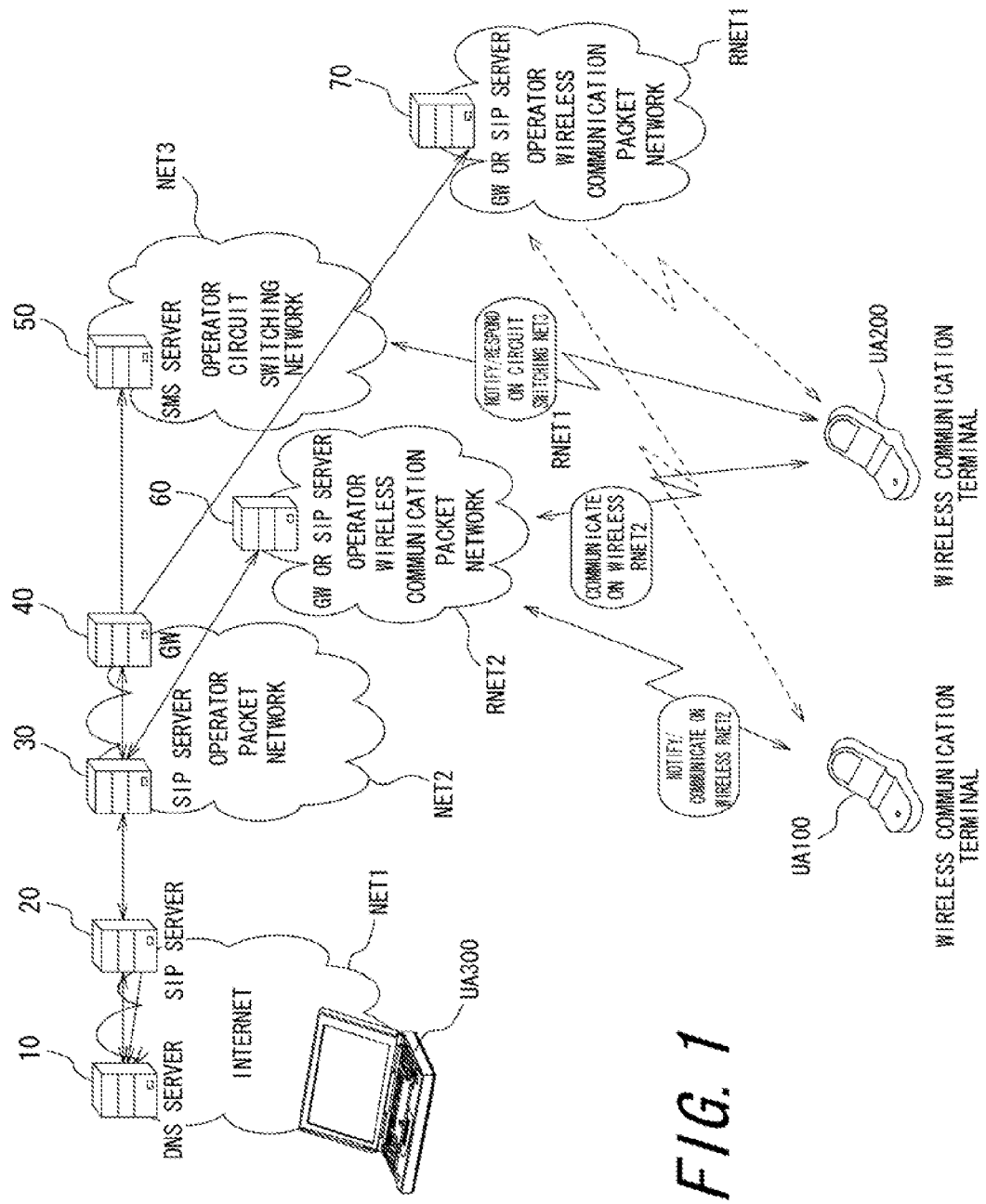
FIG. 1 is a diagram illustrating a communication system of a wireless communication network adopting a communication control method according to a first embodiment of the present invention.

Before detailed descriptions of a principle and a configuration of the present invention, a typical sequence of the present invention will be briefly described. Although the present invention is intended for a variety of types of communication apparatuses and wireless communication apparatuses, and communication control methods therefor, exemplified herebelow is a case where a calling side uses a communication apparatus (communication terminal) including a wireless communication apparatus and a called side uses a wireless communication terminal, a typical wireless communication apparatus.

(1) When a communication terminal (apparatus) having a plurality of communication network systems (devices) calls with a real-time application to a wireless communication terminal (apparatus) having a plurality of wireless communication network systems (devices), the communication terminal of a calling side notifies the wireless communication terminal of the called side of a name of a communication network (including a name of a wireless communication network) which the calling side can connect to and a bandwidth required for the desired real-time application. In consideration of a wireless communication network to which the wireless communication terminal of the called side can connect, the communication network (including the wireless communication network) to which the calling side can connect and the bandwidth required for the application, the wireless communication terminal of the called side selects a wireless communication network and notifies the communication terminal of the calling side of the selected wireless communication network of the called side and a name of the wireless communication network to which the called side can connect, as a response to the calling side. Then, based on information notified from the called side, the communication network to which the calling side can connect and the bandwidth required for the application, the communication terminal of the calling side selects a communication network to connect to and performs necessary SIP procedures on the communication networks (including the wireless communication network) selected by the calling side and the called side, so as to reach a communication state.

(2) Between the communication terminal of the calling side and the communication terminal of the called side, notification of the name of the communication network to which the calling side can connect and the bandwidth required for the real-time application desired by the calling side and notification of the network selected are performed via an SIP server. In addition, after selecting the network to use, the wireless communication terminal of the called side connects to the network selected and registers to the SIP server. The SIP server notifies the communication terminal of the calling side of a name of the network registered.

(3) Being notified of the communication network to which the communication terminal of the calling side can connect and the required bandwidth at the (1), the wireless communication terminal of the called side, if there are a plurality of communication networks satisfying the condition of the bandwidth at calling and called sides, selects a communication network with the lowest billing rate.

(4) At the above (2), the communication terminal of the calling side transmits a notification of a name of a network which the calling side desires the called side to connect to, along with the name of the communication network to which the calling side can connect and the required bandwidth for the desired real-time application.

(5) When receiving the notification from the communication terminal of the calling side at the above (4), the SIP server, if the wireless communication terminal of the called side has already connected to the same network as the desired network notified by the calling side and registered therewith, performs necessary SIP procedures without transmitting the notification to the wireless communication terminal of the called side, and reaches the communication state.

(6) When receiving the notification from the communication terminal of the calling side at the above (4), the SIP server stores a combination of the name of the desired network notified, the communication terminal of the calling side and the wireless communication terminal of the called side. When the wireless communication terminal of the called side connects and registers, the SIP server, if the wireless communication terminal of the called side connects to the desired network notified by the communication terminal of the calling side and registered therewith, performs necessary SIP procedures, and reaches the communication state.

(7) In a case where the bandwidth of the wireless communication network that the called side selects at the above (1) does not satisfy the required bandwidth desired by the calling side, the SIP server notifies the communication terminal of the calling side accordingly and the communication terminal of the calling side inquires a user to select either switching to another application which requires (needs) a narrower bandwidth or cancellation of the call to the wireless communication terminal of the called side. When cancellation is selected, the communication terminal of the calling side notifies the wireless communication terminal of the called side of the cancellation and ends communication. When switching to another application is selected, the communication terminal of the calling side switches to a communication network corresponding to the wireless communication network of the wireless communication terminal of the called side, switches to an application usable in the bandwidths of the communication networks of the calling side and the called side notified, and performs necessary SIP procedures (INVITE and the likes).

(8) In a case where the billing rate increases when switching the communication network of the calling side to correspond to the selected wireless communication network of the called side at the above (1), the terminal of the calling side shows the billing rate to the user and inquires the user to select switching of the communication network, no switching of the communication network or cancellation of the call to the wireless communication terminal of the called side. When cancellation is selected, the communication terminal of the calling side notifies the wireless communication terminal of the called side of the cancellation and ends the process. When switching is selected, the communication terminal of the calling side switches to a communication network corresponding to the network of the wireless communication terminal of the called side and performs necessary SIP procedures. When no switching is selected, the terminal of the calling side performs the necessary SIP procedures without switching the communication network.

(9) At the above (1), the communication terminal of the calling side notifies the called side of policy (desire) with regard to a selection of the wireless communication network at the called side whether to prioritize the bandwidth which the calling side wishes the wireless communication terminal of the called side to achieve or to prioritize a lower billing rate, together with the name of the communication network to which the calling side can connect and the required bandwidth for the desired real-time application. The wireless communication terminal of the called side selects a wireless communication network to use based on the policy notified with regard to the selection of the wireless network.

(10) In a case where cancellation is selected at the above (7) and (8), the terminal of the calling side inquires the user to select whether to request (a call enable notification request) the wireless communication terminal of the called side to send a notification to the communication terminal of the calling side when the wireless communication terminal of the called side becomes connectable to the desired network. When the user selects not to request, the communication terminal of the calling side notifies the wireless communication terminal of the called side of cancellation and ends the process. When the user selects to request, the communication terminal of the calling side transmits the call enable notification request to the wireless communication terminal of the called side. When receiving the call enable notification request, the wireless communication terminal of the called side inquires the user to select grant/reject and transmits a result of selection to the communication terminal of the calling side. When grant is selected, and the wireless communication terminal of the called side becomes connectable to the communication network desired by the calling side, the wireless communication terminal of the called side transmits a call enable notification (communication enable notification) notifying that the called side becomes connectable to the desired network, to the communication terminal of the calling side.

(11) At the above (10), the communication terminal of the calling side stores a condition at what rate the calling side succeeded in connecting to each wireless communication terminal of the called side on the desired network and when the calling side received the call enable notification, so as to compile statistics of connection states to each wireless communication terminal of the called side at certain periods and show them in a graph.

(12) At the above (10), the wireless communication terminal of the called side determines whether to be able to communicate on the desired network based on a type and a radio condition of the desired network and a required bandwidth for an application to be used and, when determined as being able to communicate on the desired network, transmits the call enable notification to the communication terminal of the calling side. In addition, in a case where the radio condition deteriorates after transmission of the call enable notification and it is highly possible not to satisfy the required bandwidth for the application to be used, the wireless communication terminal of the called side transmits a condition deterioration notification to the communication terminal of the calling side. When receiving the call enable notification or the condition deterioration notification, the communication terminal of the calling side notifies a user of the wireless communication terminal of the called side that the calling side can call currently, as well as information on the radio condition of the called side.

(13) At the above (10), the communication terminal of the calling side temporarily stores a screen state at a first call (stores the screen state as well as the call enable notification request when the call enable notification request transmitted is granted). In addition, when trying to call again, the communication terminal of the calling side temporarily stores a screen state and returns to the screen state at the first call, and then calls again. When the communication by the second call is ended, the communication terminal of the calling side returns to the screen state before the second call.

A preferred embodiment of the present invention will now be described with reference to the accompanying drawings.

FIG. 1 is a diagram illustrating a communication system of a wireless communication network adopting a communication control method according to a first embodiment of the present invention. As shown in FIG. 1, serving as servers or gateways are a DNS server 10, an SIP server 20, an SIP server 30, a gateway (GW) 40, an SMS server 50, an SIP server (or GW) 60, and an SIP server (or GW) 70. The SIP server 30 functions as a call control server, while the SMS server 50 functions as a message transmission server. Wireless communication terminals (UA; User Agent) 100 and 200 serve as communication terminals of the calling side and the called side, respectively, while a communication terminal (softphone) UA300 serves as a softphone. These terminals are connected to the servers via the Internet NET1, an operator packet network NET2, an operator circuit switching network NET3, and operator wireless communication packet networks RNET1, RNET2.

The wireless communication terminal UA100, the communication apparatus of the calling side, is a multi-mode terminal capable of connecting to the operator wireless communication packet network RNET1 (referred also to as a wireless network RNET1, hereinafter) and the operator wireless communication packet network RNET2 (referred also to as a wireless network RNET2, hereinafter). It is to be noted that the UA100 may be a communication apparatus of the calling side, which is not the wireless communication terminal, or a communication terminal of the calling side incapable of transmitting and receiving an SMS message. For example, the communication terminal (softphone) UA300 may serve as the communication apparatus of the calling side. The wireless communication terminal UA200, the wireless communication apparatus of the called side, is a multi-mode terminal capable of connecting to the wireless network RNET1, the wireless network RNET2, and the operator circuit switching network NET3 (referred also to as a network NET3, hereinafter). The wireless network RNET2 has a broader bandwidth than that of the wireless network RNET1. Normally, when being on standby, the wireless communication terminal UA100 registers to the SIP server 30 with one of the wireless networks. On the other hand, the wireless communication terminal UA200 is normally on standby in the operator circuit switching network NET3 and exists in a dormant state without being connected to the wireless network RNET1 and the wireless network RNET2. The communication terminal (softphone) UA300 has an environment of constant connection and has already registered to the SIP server 20.

Figure 2:
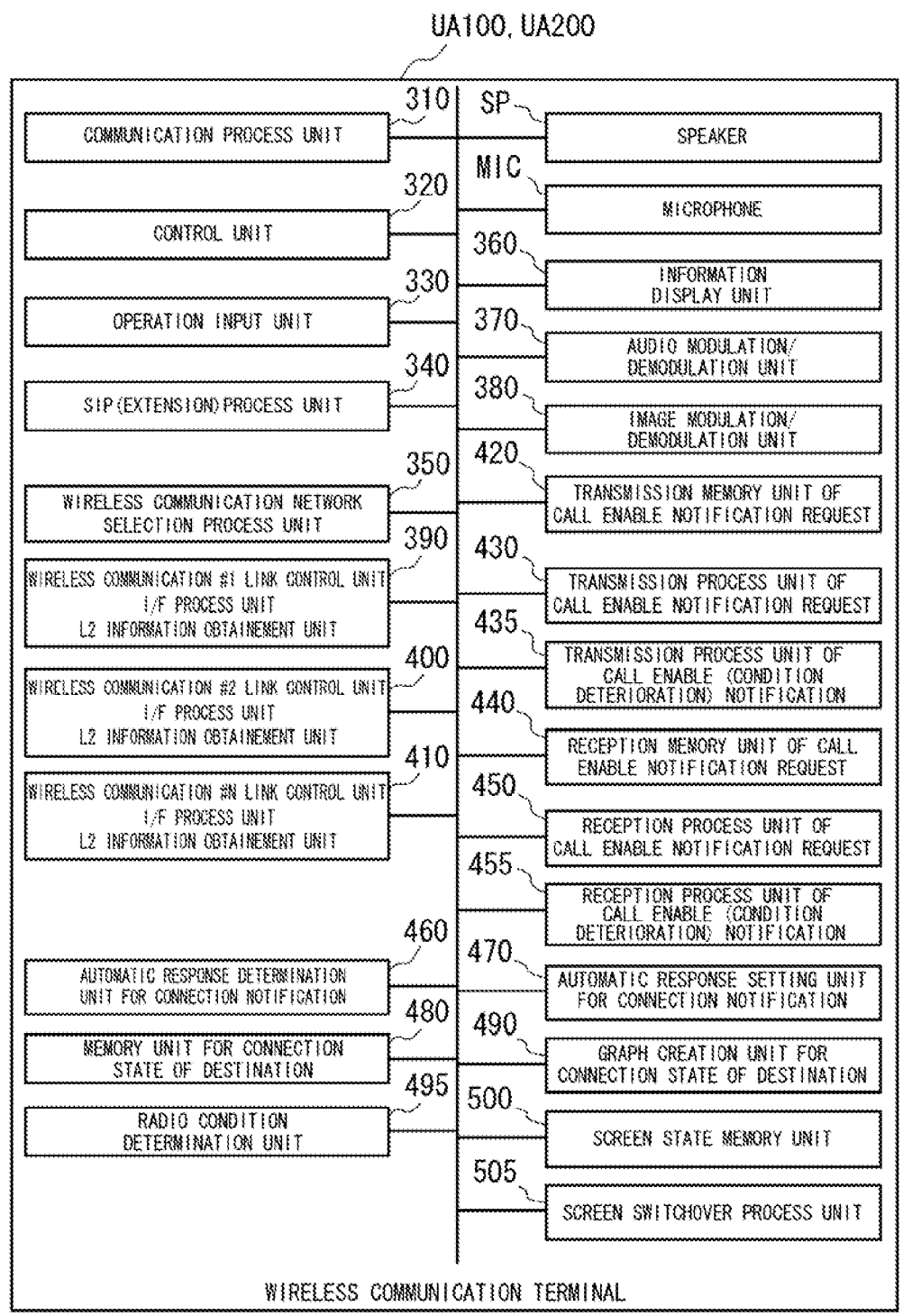
FIG. 2 is a functional block diagram of a wireless communication terminal used in the wireless communication network according to the present invention.

FIG. 2 is a functional block diagram of the wireless communication terminal (the wireless communication terminal of the calling side UA100 and the wireless communication terminal of the called side UA200) used in the wireless communication network according to the present invention. Although the communication terminal (wireless communication terminal) same as the wireless communication terminal of the called side UA200 is used as the communication terminal of the calling side UA100 according to the present invention, it is also possible to use a wired communication terminal having no wireless communication function. As shown in FIG. 2, the wireless communication terminal of the calling side UA100 and the wireless communication terminal of the called side UA200 is provided with a communication process unit 310, a control unit (CPU processor) 320, an operation (preference) input unit 330, an SIP (an extension) process unit 340, a wireless communication network selection process unit 350, a speaker SP, a microphone MIC, an information display unit 360, an audio modulation/demodulation unit 370, an image modulation/demodulation unit 380, a wireless communication #1 link control unit (including 1/F process unit and L2 information obtainment unit) 390, a wireless communication #2 link control unit (including 1/F process unit and L2 information obtainment unit) 400, a wireless communication #N link control unit (including 1/F process unit and L2 information obtainment unit) 410, a transmission memory unit of call enable notification request 420, a transmission process unit of call enable notification request 430, a transmission process unit of call enable (condition deterioration) notification 435, a reception memory unit of call enable notification request 440, a reception process unit of call enable notification request 450, a reception process unit of call enable (condition deterioration) notification 455, an automatic response determination unit for connection notification 460, an automatic response setting unit for connection notification 470, a memory unit for connection state of destination 480, a graph creation unit for connection state of destination 490, a radio condition determination unit 495, a screen state memory unit 500 and a screen switchover process unit 505. The communication process unit 310 functions as a transmission unit and a reception unit for transmitting and receiving a call establishment message (INVITE message) via the wireless communication network selection process unit 350 and one of the wireless communication #1, #2 and #N link control units 390 to 410. In addition, the communication process unit 310 also functions as a transmission unit and a reception unit for transmitting and receiving an inquiry message (SMS message) with the packet switching network via the wireless communication network selection process unit 350 and one of the wireless communication #1, #2 and #N link control units 390 to 410. The transmission process unit of call enable notification request 430 functions as a request unit, when receiving information, in response to the call request (INVITE) transmitted by the transmission unit, that the called side uses a wireless communication system not satisfying a condition of a wireless communication system of the called side desired by the calling side, for requesting the called side to transmit the call enable notification, when the called side becomes connectable to the wireless communication system satisfying the condition of the wireless communication system of the called side desired by the calling side, to inform the calling side accordingly. The transmission process unit of call enable (condition deterioration) notification 435 functions as a notification transmission process unit for performing transmission process of the call enable notification and the condition deterioration notification, as well as functioning as a memory unit for storing a condition to transmit the call enable notification. The screen state memory unit 500 functions as a memory unit for storing a screen state of the information display unit 360 at transmission of the call request (INVITE) including information on communication on the desired network and an initiation state of an application corresponding to the screen state. The control unit 320 controls the information display unit 360 to display the screen state stored in the screen state memory unit 500 when receiving the call enable notification from the called side in response to a request by the request unit and, when detecting a call instruction in the screen state, controls an application corresponding to the call instruction to send a call. In addition, the control unit 320, in a case where the screen state memory unit 500 stores a plurality of screen states of the information display unit 360 at transmission of the call request (INVITE), controls the information display unit 360 to display all of the screen states at once. When detecting a selection instruction selecting one of the screen states, the control unit 320 controls the information display unit 360 to display only a display screen corresponding to the selection instruction and, in such a state, controls an application corresponding to the display screen to send a call. Moreover, the control unit 320, in a case where the screen state memory unit 500 temporarily stores a screen state of the information display unit 360 before reception of the call enable notification and an initiation state of an application corresponding to the screen state, controls the information display unit 360 to display the screen state temporarily stored in the screen state memory unit 500 when detecting a screen return instruction after sending the call according to the call instruction.

Figure 3:
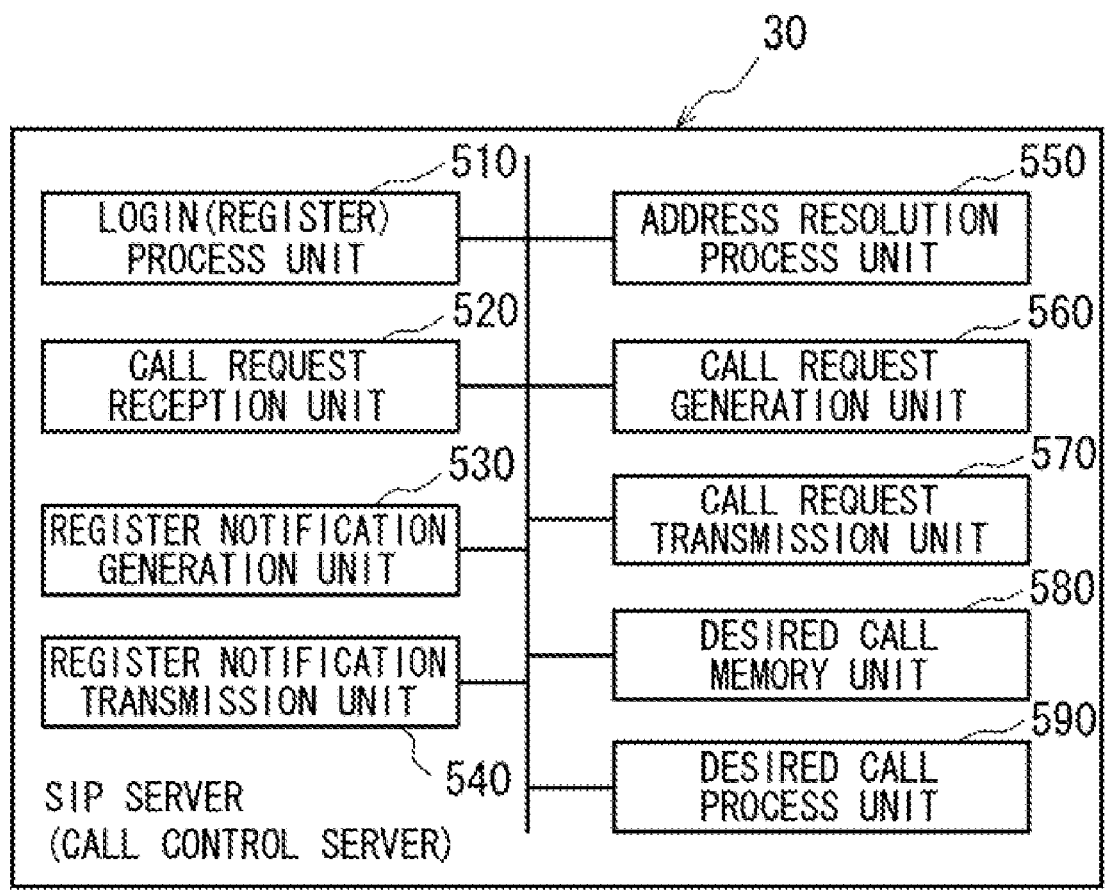
FIG. 3 is a functional block diagram of an SIP server (call control server) used in the wireless communication network according to the present invention.

FIG. 3 is a functional block diagram of the SIP server (call control server) used in the wireless communication network according to the present invention. As shown in FIG. 3, the SIP server 30 is provided with a login (register) process unit 510, a call request reception unit 520, a register notification generation unit 530, a register notification transmission unit 540, an address resolution process unit 550, a call request generation unit 560, a call request transmission unit 570, a desired call memory unit 580 and a desired call process unit 590. The login (register) process unit 510 receives a login (REGISTER) request from a terminal and performs necessary process. The call request reception unit 520 receives the call establishment message (Invite message) including preference information of the calling side and for calling the corresponding party. The call request generation unit 560 generates call request information including information indicating that the call establishment message is received and a desired condition (preference information) included in the call establishment message, so as to deliver the call establishment message received by the call request reception unit 520 to the called side. The call request transmission unit 570 transmits the call request information generated to the SMS server (message transmission server) or transmits call request information generated based on SIP protocol to the terminal of the called side. The desired call memory unit 580 stores the desired condition of a call (wireless communication network, application, billing rate and the likes that the calling side desires) received from the wireless communication terminal (an origination terminal) UA100. The desired call process unit 590 performs necessary process based on the desired condition of the call received from the wireless communication terminal (origination terminal) UA100.

Figure 4:
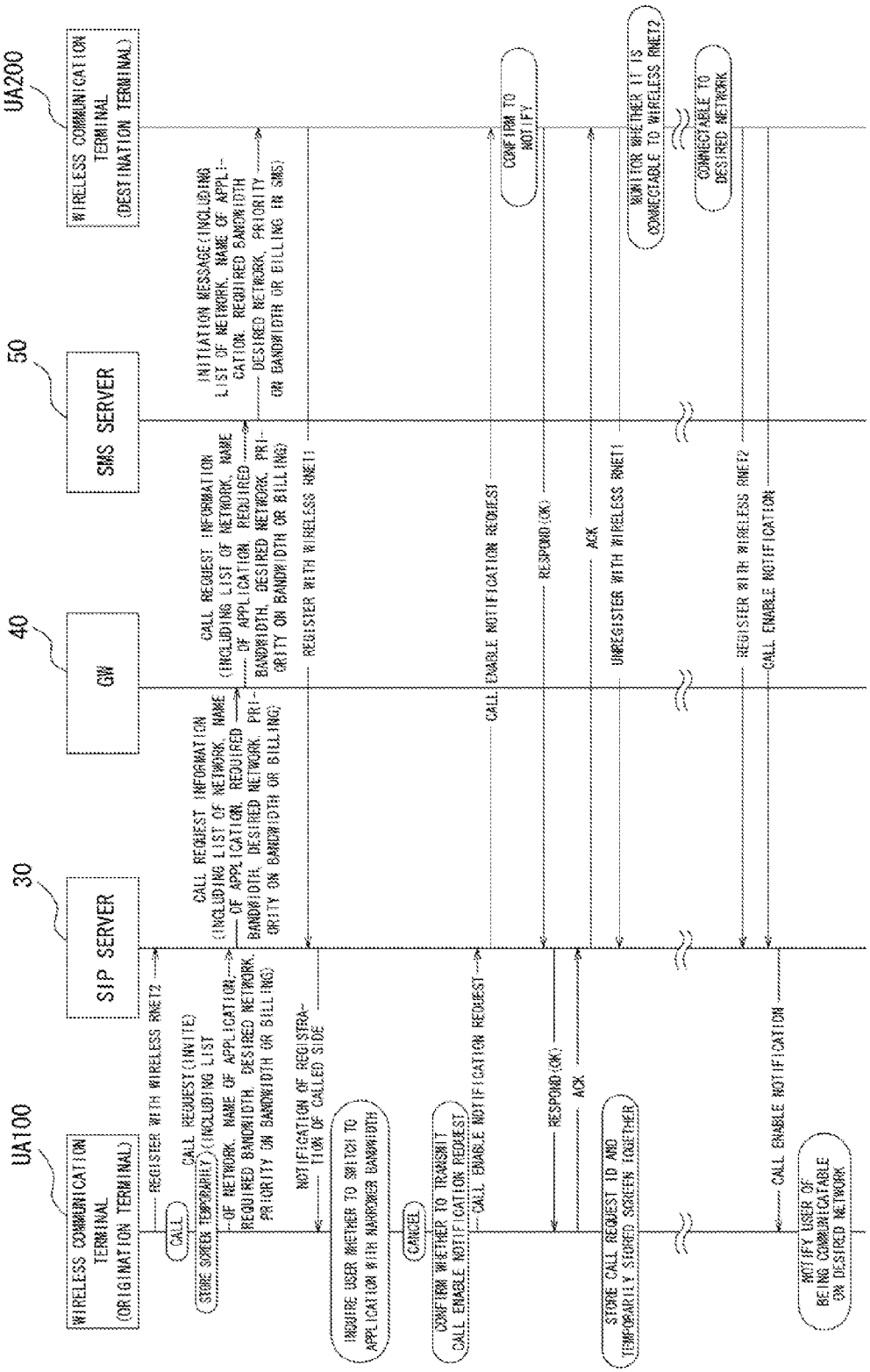
FIG. 4 is a sequence diagram illustrating communication control (communication control 1) in the communication method according to the first embodiment, performed when the wireless communication terminal of the calling side cancels a call to the wireless communication terminal of the called side, which is capable of connecting to a circuit switching network, then calls again to the called side when the called side becomes able to use a desired network, starts communication by use of a real-time application and then ends the communication.
Figure 5:
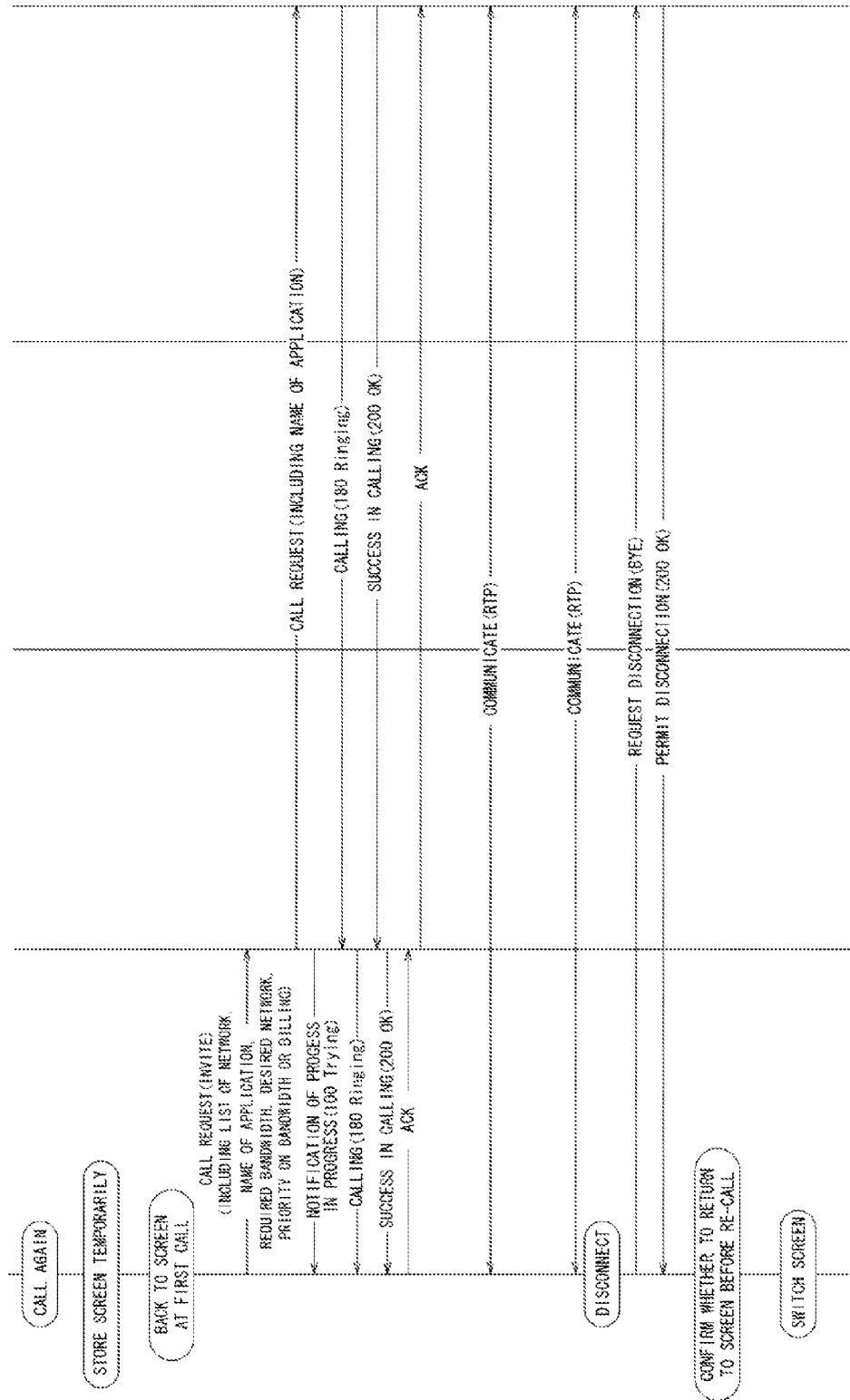
FIG. 5 is a sequence diagram illustrating communication control (communication control 1) in the communication method according to the first embodiment, performed when the wireless communication terminal of the calling side cancels the call to the wireless communication terminal of the called side, which is capable of connecting to the circuit switching network, then calls again to the called side when the called side becomes able to use the desired network, starts communication by use of the real-time application and then ends the communication.

FIG. 4 and FIG. 5 are sequence diagrams illustrating a communication control method according to the first embodiment, and each of which illustrates communication control (communication control 1) performed when the wireless communication terminal of the calling side (origination terminal) UA100 tries to call the wireless communication terminal of the called side (destination terminal) UA200, which is capable of connecting to the circuit switching network, but cancels the call for the reason that the called side cannot use the desired network, then calls again since the called side becomes able to use the desired network, starts communication by use of the real-time application and ends the communication.

First, the origination terminal UA100 connects to (uses) the operator wireless communication packet network RNET2 (referred to as the wireless RNET 2) and registers to the SIP server 30. In this case, the SIP server 30 performs process shown as steps S01 to S03 in FIG. 6. That is, when a register request is received from a terminal (origination terminal UA100, in this case) at step S01 in FIG. 6, the SIP server 30 registers an address, a number and a name of the network of the terminal in a register memory table exemplified in FIG. 7 at the next step S02. Then, since there is no desired call to the terminal to communicate with at this point, the answer is No for the determination at step S03, and thus the SIP server 30 ends its operation to reach a standby state.

Next, when the user of the origination terminal UA100 selects to call the destination terminal UA200 by use of the real-time application, the origination terminal UA100 stores (temporarily) a screen state (a type of an application being initiated, an opened window, and a position and a setting thereof) at that point (at calling). During this process, the origination terminal UA100 follows a sequence shown as steps S101, S102, S150 and S103 in FIG. 8. Specifically, as shown in a flow chart shown in FIG. 8, which is started at an initiation of the real-time application, the origination terminal UA100 selects a destination terminal and a network at step S101, sends a call at step S102, stores a screen state (a screen state at transmission of the call request, which is referred to as the screen state at the first call, hereinafter) at that point at step S150, and then transmits the call request (INVITE) at step S103. In a case where the communication network with which the origination terminal UA100 has already registered is different from the network desired by the origination terminal UA100 at the calling, the origination terminal UA100 re-registers on the desired network.

Figure 9:
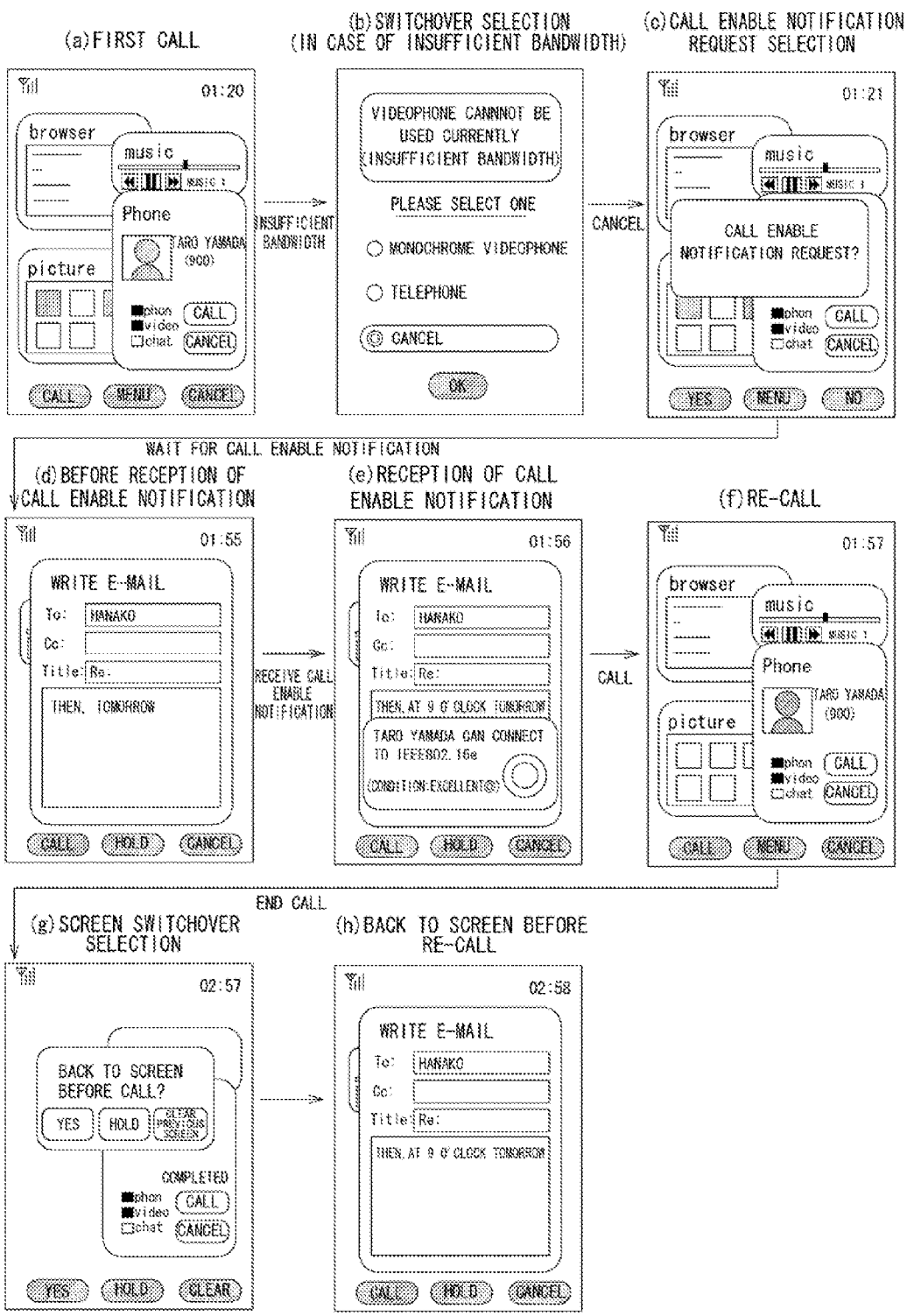
FIGS. 9(a) to 9(h) are diagrams exemplifying screen shifts of the wireless communication terminal of the calling side by the communication control 1 of the communication control method according to the first embodiment.
Figure 10:
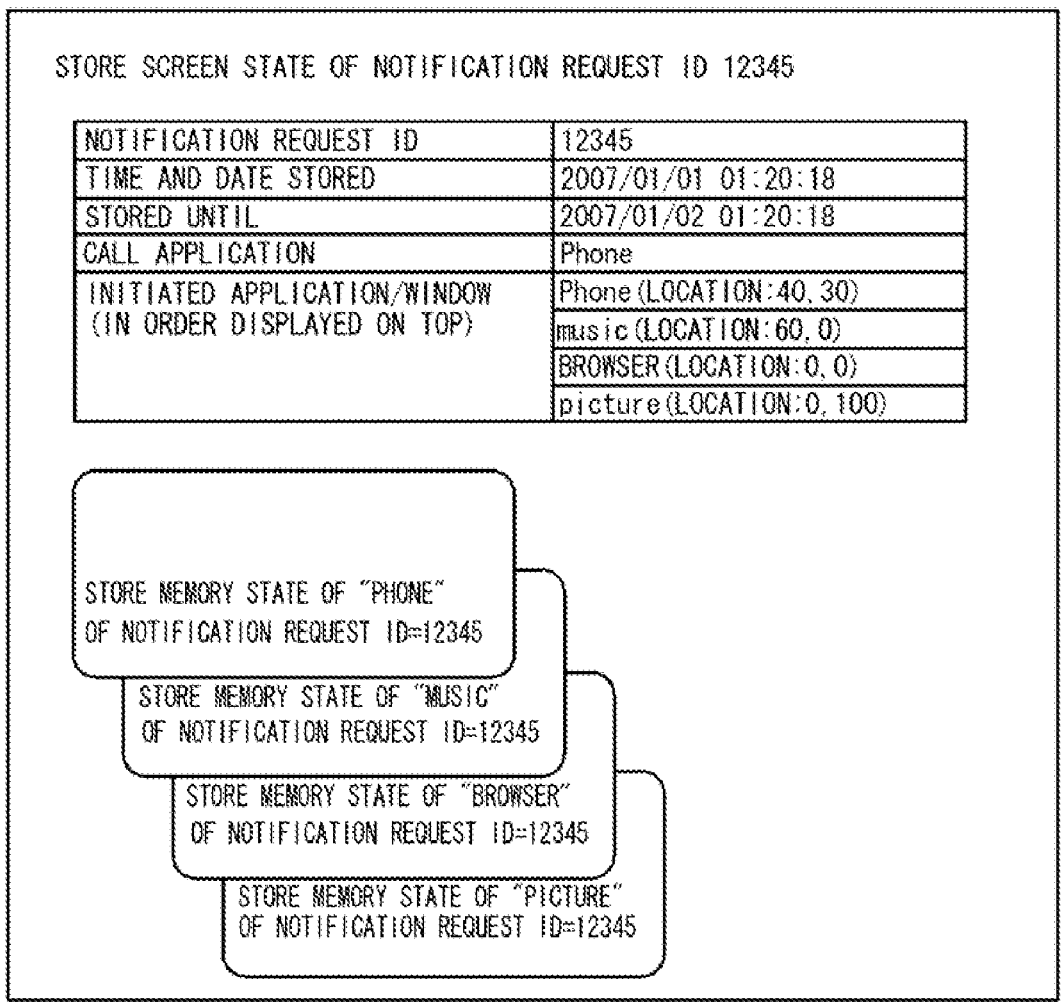
FIG. 10 is a diagram explaining memories of a screen state of the wireless communication terminal of the calling side at a first call and an initiation state of an application corresponding to the screen state by the communication control 1 of the communication control method according to the first embodiment.

At the above step S150, "the screen state at the first call" exemplified in FIG. 9(*a*), which is a diagram for explaining a screen shift of the origination terminal UA100, is stored. In "the screen state at the first call" in FIG. 9(*a*), the user initiates the softphone (a telephony application) to call the destination terminal UA200, selects a destination, and keeps other applications as well as the softphone being initiated (ON). In addition, in "the screen state at the first call", the user opens a folder which contains an image he/she wishes to transmit to the called side by use of "an image process application (picture)", or opens a website which contains information he/she wishes to pass on by use of "a browser". This is a state where the user of the origination terminal UA100 makes a preparation for sending a call to the destination terminal UA200. Such a state of the initiated application and the opened folder of the origination terminal UA100, that is, the screen state of the information display unit of the origination terminal UA100 at the first call and the initiation state of the application corresponding to the screen state are stored being associated with a notification request ID, which will be described later, as exemplified in FIG. 10.

The call request (INVITE) to the destination terminal UA200 transmitted to the SIP server 30 at the above step S103 is generated based on the format shown in FIG. 11 to include the following information:

a list of wireless networks to which the wireless communication terminal of the calling side can connect: IEEE802.16e, EVDO
a name of the application: videophone (color)
a bandwidth required for the application: 500 kbps
a wireless network the calling side desires: IEEE802.16e
information on whether "priority on the bandwidth" or "priority on the low billing rate": "priority on the bandwidth"

Figures 12, 13:
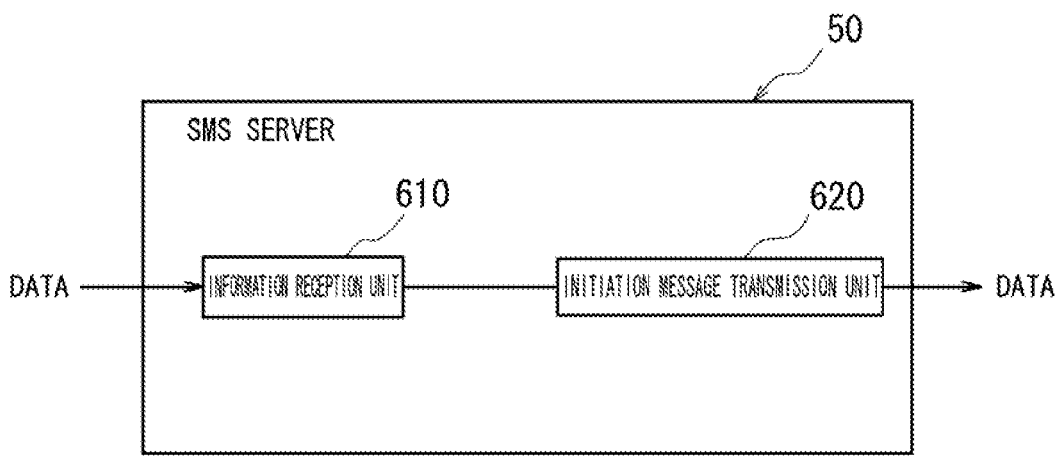
FIG. 12 is a table exemplifying a desired call memory table used by the SIP server for storing a desired call of the wireless communication terminal, in the communication control method according to the first embodiment.
FIG. 13 is a diagram illustrating a constitution of an SMS server used in a wireless communication system adopting the communication control method according to the first embodiment.
Figure 14:
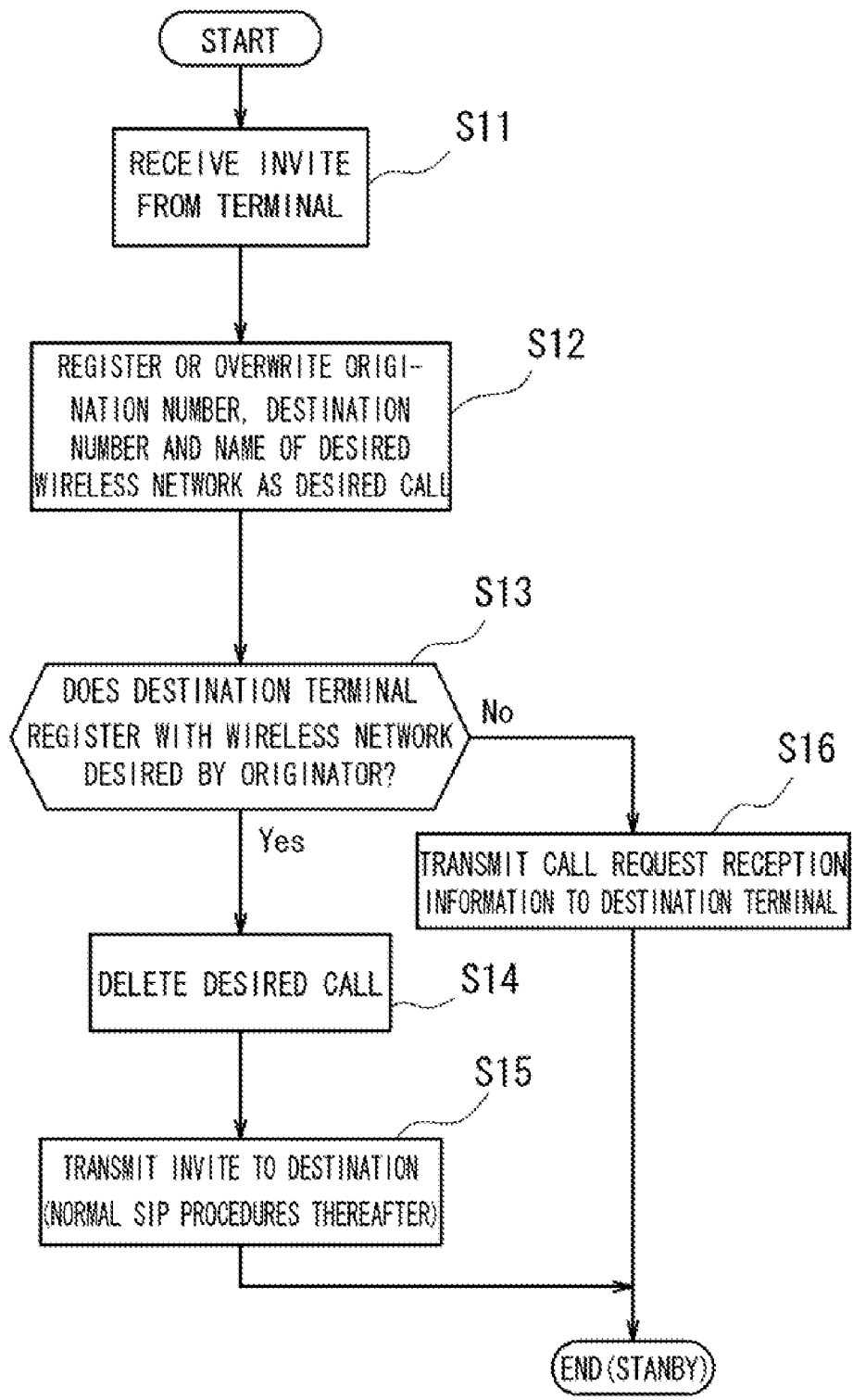
FIG. 14 is a flow chart showing the call control performed by the SIP server, in the communication control method according to the first embodiment.

When the SIP server 30, upon receiving the call request (INVITE), confirms that the destination terminal UA200 has not registered yet, the SIP server 30 stores an origination number, a destination number and the wireless network (referred to as a desired network, hereinafter) that the calling side (originator) desires as a desired call in a desired call memory table (whose configuration is exemplified in FIG. 12). Then, the SIP server 30 transmits an initiation message of SMS from the SMS server 50 (whose configuration is exemplified in FIG. 13) to the destination terminal UA200 via the GW 40. In the SMS server 50, an information reception unit 610 receives transmission request data of the initiation message from the SIP server 30 and, in response to it, an initiation message transmission unit 620 generates and transmits the initiation message to the destination terminal UA200. This initiation message also contains the same information as contained in the call request (INVITE). During this process, the SIP server 30 follows a sequence shown as steps S11 to S13 and S16 in FIG. 14. Specifically, when receiving the call request (INVITE) from the terminal (the origination terminal UA100, in this case) at step S11 in FIG. 14, the SIP server 30 registers or overwrites the combination of the number of the origination terminal and the number of the destination terminal, to which the call request (INVITE) is intended, and the name of the wireless network desired by the origination terminal, as the desired call in the desired call memory table, at the next step S12. At the following step S13, it is determined whether the destination terminal has registered with the wireless network desired by the origination terminal and, if not registered, the SIP server 30 proceeds to step S16 to transmit the call request information to the destination terminal via the SMS server 50, and then ends its operation to reach the standby state.

When the wireless network of the wireless communication terminal of the called side UA200 which has already registered to the SIP server 30 is the wireless network desired by the origination terminal UA100 at determination of step S13, the SIP server 30 transmits the call request (INVITE) as it is to the destination terminal. In this case, the SIP server 30 follows a sequence shown as the Yes branch of step S13, steps S14 and S15 in FIG. 14. Specifically, if the answer is Yes for the determination at step S13 in FIG. 14, the SIP server 30 deletes the desired call at step S14 and transmits the call request (INVITE) to the destination terminal and then performs normal SIP procedures thereafter at the next step S15.

In addition, in a case where the destination terminal UA200 is incapable of connecting to the operator circuit switching network (NET2), the call request (INVITE) information may be included in paging information of the operator wireless communication packet network (RNET1 or RNET2) to call the destination terminal. Moreover, in a case where the destination terminal is a PC or the likes connected to the internet and has already registered to the SIP server 30, the call request (INVITE) information may be transmitted to the address of the terminal.

When receiving the initiation message from the SMS server 50, the destination terminal UA200, in consideration of information in the initiation message and the wireless network to which the terminal itself can currently connect, selects the operator wireless communication packet network RNET1 as a wireless network to which the destination terminal UA200 connects. After connecting to the wireless network selected, the destination terminal UA200 registers to the SIP server 30. At the registration, the SIP server 30 confirms that the destination terminal UA200 connects to the operator wireless communication packet network RNET1 (the wireless network different from the one desired by the origination terminal UA100) and registers therewith, and the SIP server 30 notifies the origination terminal UA100 that the destination terminal UA200 has registered with the operator wireless communication packet network RNET1. In this case, since the destination terminal UA200 connects to the wireless network different from the one desired by the origination terminal UA100 and registers therewith, the SIP server 30 controls so as not to transmit the call request (INVITE) to the destination terminal.

Figure 6:
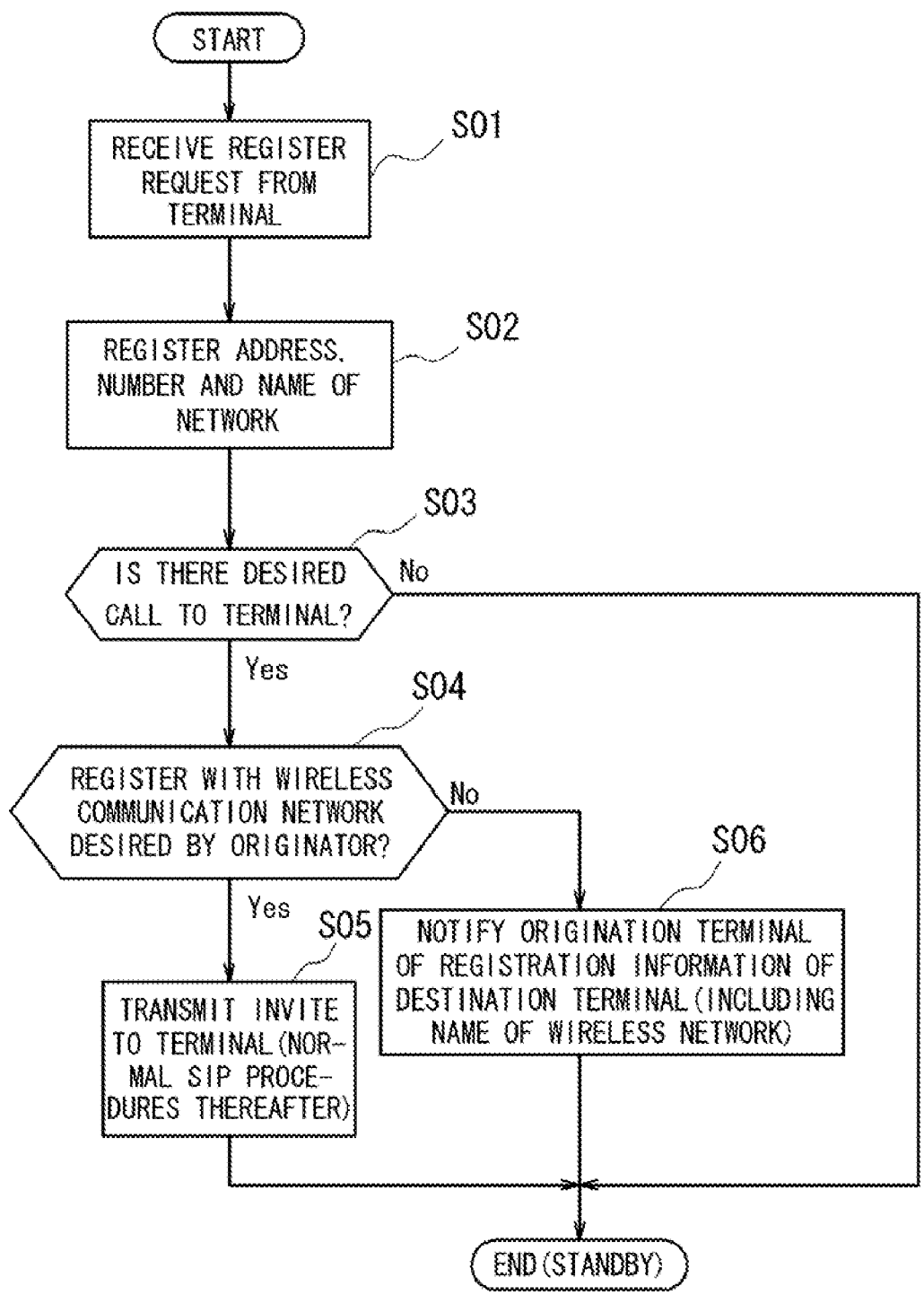
FIG. 6 is a flow chart showing call control performed by the SIP server, in the communication control method according to the first embodiment.

In this case, the SIP server 30 follows a sequence shown as steps S01 to S03, the Yes branch of step S03, step S04, the No branch of step S04, and then step S06 in FIG. 6. Specifically, when receiving a register request from a terminal (the destination terminal UA200, in this case) at step S01 in FIG. 6, the SIP server 30 registers the address, the number and the name of the network of the terminal in the register memory table exemplified in FIG. 7, at the next step S02. Then, since there is the desired call to the terminal itself (destination terminal UA200), it is determined as Yes at step S03 and the process flow proceeds to step S04. At step S04, it is determined whether the destination terminal UA200 registers with the wireless network (RNET2) desired by the origination terminal UA100, and since it is determined as No, the process flow proceeds to step S06. At step S06, the SIP server 30 notifies the origination terminal UA100 of registration information (including the name of the wireless network registered) of the destination terminal UA200. In a case where the destination terminal UA200 connects to the wireless network desired by the origination terminal UA100 and registers therewith, it is determined as Yes at step S04 and the process flow proceeds to step S05, where the SIP server 30 transmits the call request (INVITE) to the destination terminal UA200 and performs the normal SIP procedures thereafter to start the communication.

When the origination terminal UA100, upon being notified of the above registration information, confirms that the wireless network (RNET1) does not have enough bandwidth and that the billing rate of the wireless network (RNET1) is lower than that of the wireless network (RNET2), the origination terminal UA100 displays a switchover selection screen, which is exemplified in FIG. 9(*b*), so as to inquire the user whether to switch to an application (monochrome videophone or telephone) which requires a narrower bandwidth to communicate or to cancel the call to the user. When the user views the switchover selection screen and selects cancellation, the origination terminal UA100 displays a call enable notification request selection screen shown in FIG. 9(*c*) such that the user can select whether to transmit "the call enable notification request" requesting the destination terminal UA200, when the destination terminal UA200 becomes able to use the desired network, to notify the calling side accordingly. In a case where the user views the call enable notification request selection screen and selects "No (Do not transmit)", the origination terminal UA100 reports the cancellation to the SIP server 30. The SIP server 30 transfers the report to the destination terminal UA200, which then disconnects the wireless network (RNET1) as necessary.

Figure 8:
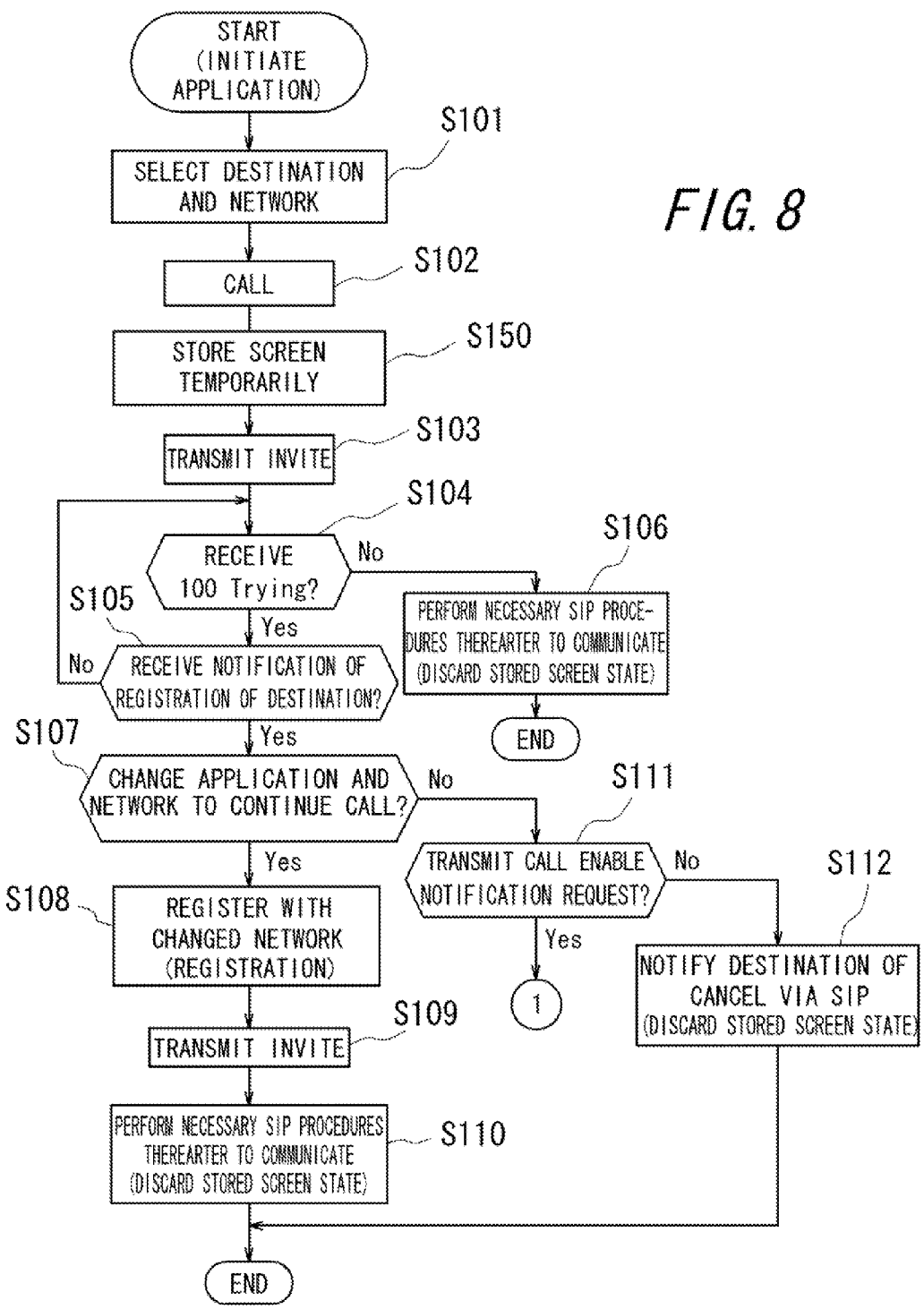
FIG. 8 is a flow chart showing a communication control performed by the wireless communication terminal of the calling side, in the communication control method according to the first embodiment.

During the above process, the origination terminal UA100 performs a process shown as steps S104 to S112 in FIG. 8. Specifically, the origination terminal UA100 determines whether to have received "100Trying" at step S104 in FIG. 8. When having received "100 Trying", the origination terminal UA100 proceeds to step S105, whereas when not having received it, the origination terminal UA100 proceeds to step S106 to perform necessary SIP procedures thereafter to perform communication. The origination terminal UA100 determines whether to have received a notification of registration of the destination terminal at step S105 and, if No, it returns to step S104 and repeats the steps thereafter, whereas the origination terminal UA100 proceeds to step S107, if Yes, to determine whether to change the application or the network so as to continue to call. When it is determined as Yes (call), the origination terminal UA100 cancels the current call request (INVITE) and registers with the network switched to at step S108, and then generates a new call request (INVITE) based on the previous call request (INVITE) and transmits it at step S109. The origination terminal UA100 then proceeds to step S110 to perform necessary SIP procedures thereafter (at this point, the screen state which has been stored is discarded). On the other hand, when it is determined as No (Cancel) at step S107, the origination terminal UA100 determines whether to transmit the call enable notification request at step S111. If Yes (Transmit), the origination terminal UA100 proceeds to step S113 in FIG. 15 to transmit the call enable notification request, whereas the origination terminal UA100 proceeds to step S112, if No (Do not transmit), to notify the destination terminal UA200 of the cancellation via the SIP server 30 (at this point, a screen state which has been stored is discarded).

In a case where the user selects "Yes (transmit)" at the inquiry whether to transmit the call enable notification request, the origination terminal UA100 displays user selection screens exemplified in FIGS. 16(*a*), (*b*), in order to confirm the destination of the call enable notification request, the desired network and the application to use and to ask the user to input a valid duration and a message. When the user confirms and inputs as desired after viewing the user selection screens, the origination terminal UA100 assigns an ID (notification request ID) to the call enable notification request, transmits the call enable notification request for the destination terminal UA200 (comprised of a message defined by SIP and a message indicating contents of the call enable notification, as exemplified in FIG. 17) to the SIP server 30, which is transferred from the SIP server 30 to the destination terminal UA200. During this operation, the origination terminal UA100 follows a sequence shown as the No branch of step S107, the Yes branch of step S111, and step S113 described above.

When receiving the call enable notification request, the destination terminal UA200 selects whether to grant the call enable notification request. The destination terminal UA200 is provided with an automatic mode to automatically select whether to grant and a manual mode for the user to select whether to grant. In a case where the destination terminal UA200 is set to the manual mode for the user to select whether to grant, the destination terminal UA200 notifies the user that the call enable notification request is received and asks the user to select grant/rejection. On the other hand, in a case where the automatic mode is set for the destination terminal UA200 to automatically select grant/rejection, it is set in advance by the user whether to reject all, to grant all, to select for each notification party or the likes based on whether its silent mode is ON/OFF (FIG. 18(a) exemplifies the user selection screen to be displayed in this case), for example. In a case where "select for each notification party" is selected, it is set in advance either to reject or grant the request for each notification party (FIG. 18(b) exemplifies the user selection screen to be displayed in this case). The destination terminal UA200 determines whether to grant or reject the call enable notification request, based on an identification of the origination terminal UA100, which sends the call enable notification request, and whether the silent mode of the destination terminal UA200 is ON or OFF at a point of receiving the call enable notification request. In a case where it is determined to grant, grant (OK) as a response is notified from the destination terminal UA200 to the origination terminal UA100 via the SIP server 30, and transmission information and reception information of the call enable notification request is stored as history in both of the destination terminal UA200 and the origination terminal UA100 (FIG. 19 (the origination terminal) and FIG. 20 (the destination terminal) exemplify the information history). In addition, a screen state at transmission temporarily stored is stored being associated with the notification request ID. At this point, with regard to other call enable notification requests, screen states at transmission are stored being associated with notification request IDs, respectively. Specifically, "a screen state at the first call" of FIG. 9(a) is stored as exemplified in FIG. 10. Then, when the destination terminal UA200 receives ACK transmitted from the origination terminal UA100 having received the above response (OK) via the SIP server 30, the destination terminal UA200 unregisters to the SIP server 30 and starts monitoring whether it can connect to the network desired by the calling side.

Figure 15:
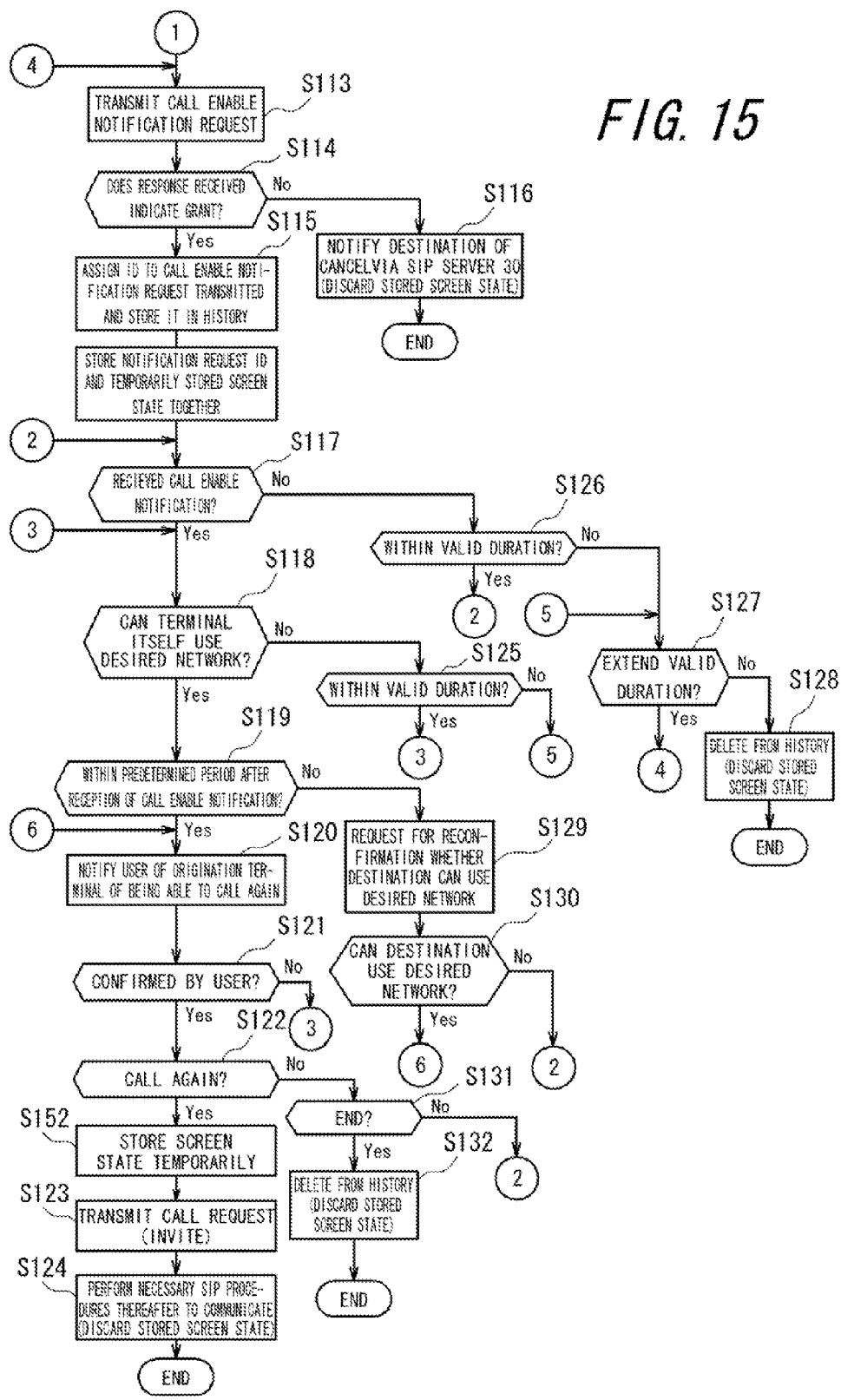
FIG. 15 is a flow chart showing the communication control performed by the wireless communication terminal of the calling side, in the communication control method according to the first embodiment.
Figure 21:
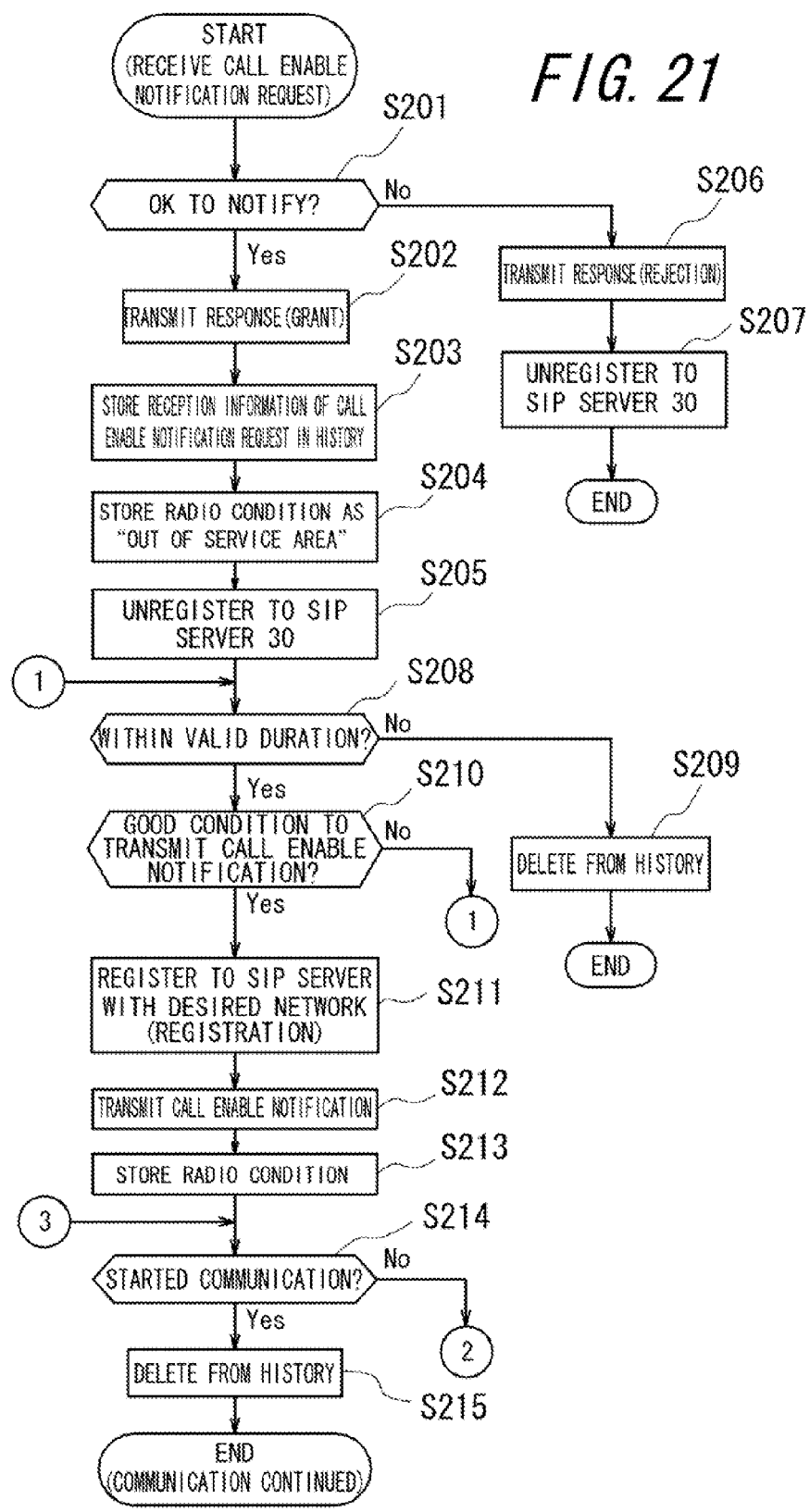
FIG. 21 is a flow chart showing communication control with regard to the call enable notification performed by the wireless communication terminal of the called side, in the communication control method according to the first embodiment.

During the above process, the destination terminal UA200 follows a sequence shown as steps S201 to S210 in FIG. 21, while the origination terminal UA100 follows a sequence shown as steps S114 to S151 in FIG. 15.

The destination terminal UA200 confirms whether to notify at step S201 in the flow chart of FIG. 21, which is started when the call enable notification request is received. When it is determined as Yes, the destination terminal UA200 proceeds to step S202, whereas the destination terminal UA200 proceeds to step S206 when it is determined as No. The destination terminal UA200 transmits a response (grant; OK) at step S202, stores reception information of the call enable notification request in the history at step S203, stores a radio condition as "Out of Service Area" at step S204, and then unregisters to the SIP server 30 at step S205. On the other hand, the destination terminal UA200 transmits (notifies) a response (rejection; NG) at step S206, unregisters to the SIP server 30 at the next step S207, and then ends its operation. At step S208 following step S205, it is determined whether it is within the valid duration and, if it is determined as No (not within the valid duration), the destination terminal UA200 proceeds to step S209 to delete reception information of the call enable notification request from the history and end its operation, whereas the destination terminal UA200 proceeds to step S210 and thereafter, if Yes (within the valid duration).

The origination terminal UA100 confirms whether the received response indicates a grant (OK) at step S114 in FIG. 15. If Yes (granted by the user), the origination terminal UA100 proceeds to step S115 to assign the ID to the call enable notification request and stores transmission information of the call enable notification request in the history and then to step S151 to store the notification request ID and the temporarily stored screen state together, whereas the origination terminal UA100 proceeds to step S116 to notify the destination terminal UA200 of the cancellation via the SIP server 30 and ends its operation, if No (rejected by the user) (At this point, the screen state which has been stored is discarded).

Then, when the destination terminal UA200, monitoring whether it can connect to the network desired by the calling side, moves into an area connectable to the wireless network RNET2 desired by the calling side and can communicate on the wireless network RNET2, the destination terminal UA200 connects to the wireless network RNET2, registers to the SIP server 30 and transmits the call enable notification so as to notify the origination terminal UA100 that the destination terminal UA200 can communicate on the wireless network RNET2 via the SIP server 30. The call enable notification includes the notification request ID. During this process, the destination terminal UA200 follows a sequence shown as steps S210 to S212 in FIG. 21. Specifically, in a case where the answer is No for step S210, where it is confirmed whether the destination terminal UA200 can connect to the network desired by the calling side, a loop comprised of the No branch of step S210, the Yes branch of step S208 and step S210 is repeated. When it is determined as Yes at step S210, the destination terminal UA200 proceeds to step S211 to register to the SIP server 30 with the wireless network RNET2, which is the network desired by the calling side, and then to step S212 to transmit the call enable notification. The call enable notification is transmitted to the origination terminal UA100 via the SIP server 30.

When receiving the call enable notification, the origination terminal UA100 confirms whether the origination terminal UA100 itself can connect to the desired network. If the origination terminal UA100 can connect to the desired network, it notifies the user that "the origination terminal UA100 can communicate with the destination terminal UA200 on the desired network (that is, the origination terminal UA100 can call again the destination terminal UA200)" by displaying "a screen at reception of the call enable notification" exemplified in FIG. 9(e), instead of "a screen before reception of the call enable notification" exemplified in FIG. 9(d). When the user views and confirms the screen displayed, the origination terminal UA100 proceeds to the sequence diagram shown in FIG. 5 and asks the user to select whether to call (call again) the destination terminal UA200 with the previous desired network and application. When the user selects to call, the origination terminal UA100 temporarily stores "the screen state before reception of the call enable notification" shown in FIG. 9(d), which is a current screen state, and then displays "a screen when calling again" exemplified in FIG. 9(f) (returns to "the screen state at the first call" in FIG. 9(a)). Then, the origination terminal UA100 registers to the SIP server 30 in the same process as the above steps S101 and thereafter and calls the destination terminal UA200 to communicate therewith. It is also possible to perform the same process as step S103 and thereafter.

During this process, the origination terminal UA100 follows a sequence shown as steps S117 to S124 in FIG. 15. Specifically, when it is determined as Yes at step S117 for confirming whether to have received the call enable notification, the origination terminal UA100 confirms whether the terminal itself can connect to the desired network at step S118 and, if connectable, proceeds to step S119 to confirm whether it is within a predetermined period since the call enable notification is received. If it is determined as Yes (within the predetermined period), the origination terminal UA100 proceeds to step S120 to notify the user that the origination terminal UA100 can call again the destination terminal UA200. At the next step S121, the origination terminal UA100 checks whether the user has confirmed, and then returns to step S118 if there is no confirmation (No), whereas the origination terminal UA100 proceeds to step S152, when there is a confirmation (Yes), to store the screen state temporarily, and to step S123 to transmit the call request (INVITE) and then to step S124 to perform necessary SIP procedures to communicate (At this point, the screen state which has been stored is discarded). After end of the communication, the origination terminal UA100 displays "a screen switchover selection screen" exemplified in FIG. 9(g) such that the user confirms whether to return to the screen before the second call and, in a case where it is selected to return thereto, displays the screen before the second call exemplified in FIG. 9(h) (returns to "the screen state before reception of the call enable notification" in FIG. 9(d)). The process after end of the communication is omitted in a flow chart in FIG. 15.

In a case where the origination terminal UA100 itself cannot connect to the desired network at the above step S118, the origination terminal UA100 continues to check for whether the terminal itself can connect to the network desired until the valid duration has passed. When the origination terminal UA100 itself becomes connectable to the desired network during the check and it is within the predetermined period after reception of the call enable notification, it notifies the user that "the origination terminal UA100 can communicate on the desired network (the origination terminal UA100 can call again the destination terminal UA200)". During this process, the origination terminal UA100 confirms whether it is within the valid duration at step S125, to which the origination terminal UA100 proceeds if it is determined as No at the step S118 in FIG. 15, and returns to the step S118 as it is within the valid duration and determined as Yes at step S125. Then, the origination terminal UA100 proceeds along the Yes branch of step S118 to step S119 to confirm whether it is within the predetermined period since the reception of the call enable notification.

In a case where the valid duration has passed without reception of the call enable notification, the origination terminal UA100 inquires the user whether to extend the valid duration and, in a case where the user selects to extend, retransmits the call enable notification request to the destination terminal UA200.

During this process, the origination terminal UA100 follows a sequence shown as the No branch of step S117 and steps S126 to S128 in FIG. 15. Specifically, at step S126, to which the origination terminal UA100 proceeds along the No branch of step S117 when not having received the call enable notification, the origination terminal UA100 confirms whether it is within the valid duration and, if it is determined as Yes (within the valid duration), returns to step S117, while proceeding to step S127 to ask the user whether to extend the valid duration, if No (not within the valid duration). When the user selects Yes (Extend), the origination terminal UA100 returns to step S113 to retransmit the call enable notification request to the destination terminal UA200, whereas the origination terminal UA100 proceeds to step S128, when the user selects No (Do not extend) to delete transmission information of the call enable notification request from the history and ends its operation (at this point, the screen state which has been stored is discarded). In a case where the valid duration has passed at step S125 as well, the origination terminal UA100 follows steps S127 to S128.

In a case where the predetermined period has passed before the user of the origination terminal UA100 confirms the call enable notification after receiving the notification, the origination terminal UA100 transmits the call enable notification request to reconfirm whether the destination terminal UA200 can use the desired network.

During this process, the origination terminal UA100 follows a sequence shown as the No branch of step S119 and steps S129, S130 and steps thereafter in FIG. 15. Specifically, when the predetermined period has passed after reception of the call enable notification, the origination terminal UA100 proceeds along the No branch of step S119 to step S129, to request for reconfirmation of whether the destination terminal UA200 can use the desired network. At the next step S130, the origination terminal UA100 reconfirms whether the destination terminal UA200 can use the desired network and, in a case of receiving the call enable notification notifying that the destination terminal UA200 can use the desired network (Yes) in response to the reconfirmation, proceeds from step S120 to step S121 to wait for the user of the origination terminal UA100 to confirm the call enable notification. On the other hand, when receiving a notification notifying that the destination terminal UA200 cannot use the desired network (No) in response to the reconfirmation at step S130, the origination terminal UA100 returns to step S117 to wait for a next call enable notification transmitted from the destination terminal UA200. In a case where the user of the origination terminal UA100 selects No (Do not retransmit) at the above step S122, the origination terminal UA100 proceeds to step S131 to check whether to end. If No (Do not end), the origination terminal UA100 returns to step S118. If Yes (End), the origination terminal UA100 proceeds to step S132 to delete the transmission information of the call enable notification request from the history and ends as it stands (at this point, the screen state which has been stored is discarded).

After transmitting the call enable notification, the destination terminal UA200 performs the history process similar to that of the origination terminal UA100.

Figure 22:
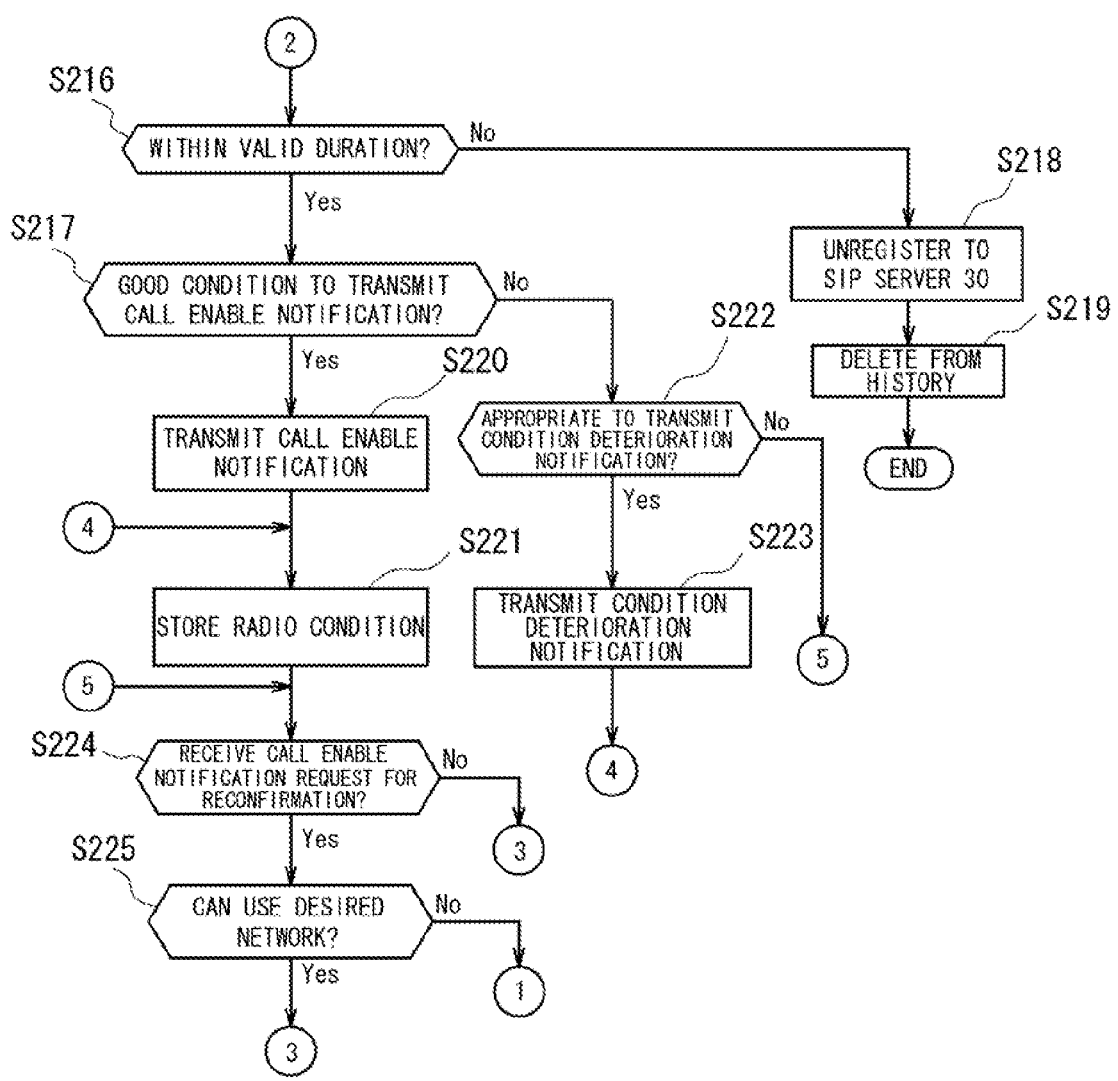
FIG. 22 is a flow chart showing communication control with regard to the call enable notification performed by the wireless communication terminal of the called side, in the communication control method according to the first embodiment.

Specifically, at step S213, to which the destination terminal UA200 proceeds after transmitting the call enable notification at step S212 in FIG. 21, the destination terminal UA200 stores the radio condition, and confirms whether communication is started at the next step S214. When it is determined as Yes (communication is started), the destination terminal UA200 proceeds to step S215 to delete the reception information of the call enable notification request from the history and then ends the process (communication is continued), whereas when it is determined as No (communication is not started), the destination terminal UA200 proceeds to step S216 in FIG. 22.

It is confirmed whether it is within the valid duration at step S216 and, when it is determined as Yes (within the valid duration), the destination terminal UA200 proceeds to step S217, while proceeding to step S218, when it is determined as No (not within the valid duration) to unregister to the SIP server 30 and then to step S219 to delete reception information of the call enable notification request from the history, and then ends its operation. At step S217, the destination terminal UA200 confirms whether it is a good condition to transmit the call enable notification and, when it is determined as Yes (good condition to transmit the notification), proceeds to step S220 to transmit the call enable notification, and then to step S221 to store the radio condition. When it is determined as No (poor condition to transmit the notification) at step S217, the destination terminal UA200 proceeds to step S222 to confirm whether it is an appropriate condition to transmit the condition deterioration notification (it is a kind of the call enable notification). When it is determined as Yes (appropriate condition to transmit the notification) at step S222, the destination terminal UA200 proceeds to step S223 to transmit the condition deterioration notification and then to the above step S221 to store the radio condition. When it is determined as No (inappropriate condition to transmit the notification) at step S222, the destination terminal UA200 proceeds to step S224. It is confirmed whether the call enable notification request for reconfirmation is received at step S224 and, when it is determined as No (not received), the destination terminal UA200 returns to step S214 in FIG. 21, while proceeding to step S225 when it is determined as Yes (received). It is determined whether the destination terminal UA200 can connect to the network desired by the calling side at step S225 and, when it is determined as No (not connectable), the destination terminal UA200 returns to step S208 in FIG. 21. When it is determined as Yes (connectable), the destination terminal UA200 returns to step S214 in FIG. 21 to wait for start of communication (call).

At determination whether the destination terminal UA200 can connect to (communicate with) the desired network at the above step S225 (same as determination at step S210 in FIG. 21), the destination terminal UA200, on receiving the call enable notification request, monitors the radio condition of the network desired by the origination terminal UA100 and, when the radio condition changes, stores the radio condition. Process corresponding to this storing operation by the destination terminal UA200 is shown as steps S204 and S213 in FIG. 21 and step 221 in FIG. 22. For the radio condition, it is determined to which one of a plurality levels (3 levels in an exemplified figure) the radio condition corresponds, based on each parameter in a radio condition determination table exemplified in FIG. 23. Radio condition 1 indicates that the radio condition is the worst, while radio condition 3 indicates that the radio condition is the best. For example, the radio condition of EVDO is 3 when RSSI is −70 dB or over and simultaneously SINR is 5 or over. In addition, the destination terminal UA200 determines whether to transmit the call enable notification based on conditions indicated in a notification determination table exemplified in FIG. 24 and, when it is a good condition to transmit the call enable notification, transmits the call enable notification. For example, in a case where the required bandwidth is 5 Mbps and the desired network is IEEE802.16e, the call enable notification is transmitted when the radio condition changes from out-of-service area, 1 or 2 to 3. In the notification determination table shown in FIG. 24, a condition for the call enable notification (condition to transmit the call enable notification) and a condition for condition deterioration notification (condition to transmit the condition deterioration notification) are changed based on the required bandwidth for the application, and conditionality is strictly applied as the required bandwidth becomes higher. During this process, the destination terminal UA200 follows a sequence shown as steps S210 to S212 in FIG. 21.

In addition, in a case where the radio condition deteriorates after the call enable notification is once transmitted, it is determined whether to transmit the condition deterioration notification based on the conditions indicated in the notification determination table in FIG. 24 and, when it is determined to transmit, the destination terminal UA200 transmits the condition deterioration notification. During this process, the destination terminal UA200 follows a sequence shown as the Yes branch of step S222 and step S223 in FIG. 22. After transmitting the condition deterioration notification, it is determined whether to transmit the call enable notification in the same manner based on the conditions indicated in the notification determination table in FIG. 24. When it is determined to transmit, the destination terminal UA200 transmits the call enable notification. During this process, the destination terminal UA200 follows a sequence shown as the Yes branch of step S217 and step S220 in FIG. 22.

Figure 25A:
FIGS. 25(a) and 25(b) are diagrams respectively exemplifying a display screen displayed on the wireless communication terminal of the calling side when receiving the call enable notification and a display screen displayed when receiving a condition deterioration notification.
Figure 25B:
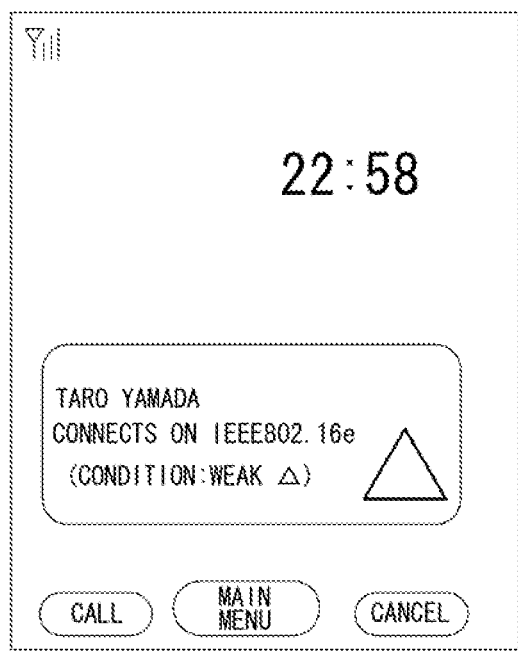

On the other hand, when receiving the call enable notification, the origination terminal UA100 displays the display screen exemplified in FIG. 25(a) so as to notify the user that "the destination terminal has a good radio condition". When receiving the condition deterioration notification, the origination terminal UA100 displays the "display screen at reception of the condition deterioration notification" exemplified in FIG. 25(b) so as to notify the user that "in a case to connect on the desired network, the required bandwidth may not be obtained".

Figure 26:
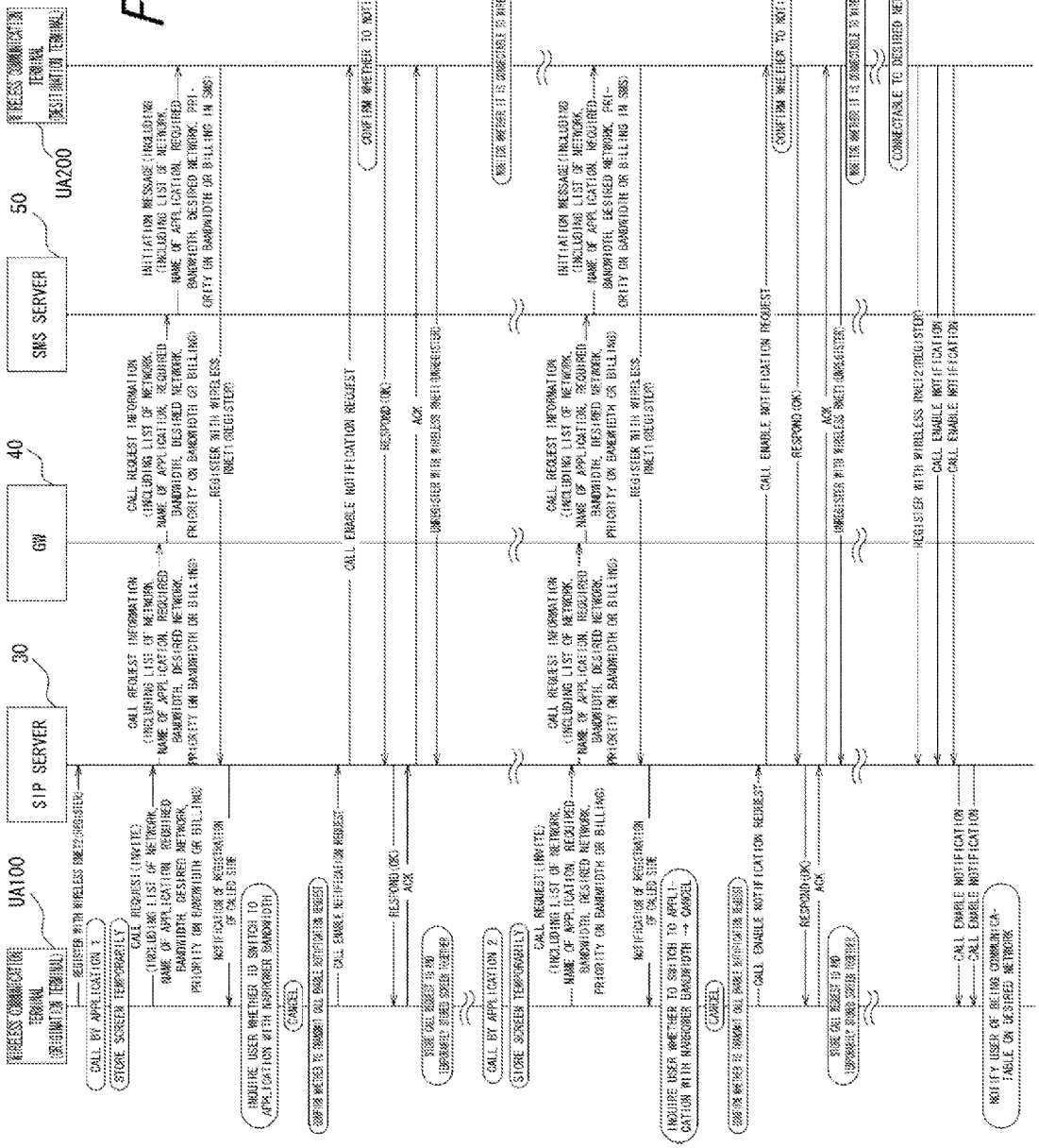
FIG. 26 is a sequence diagram illustrating communication control (communication control 2) in the communication control method according to the first embodiment, performed when the wireless communication terminal of the calling side cancels a call to the wireless communication terminal of the called side, which is capable of connecting to the circuit switching network, then calls again to the called side when the called side becomes able to use the desired network, starts communication by use of the real-time application and then ends the communication.
Figure 27:
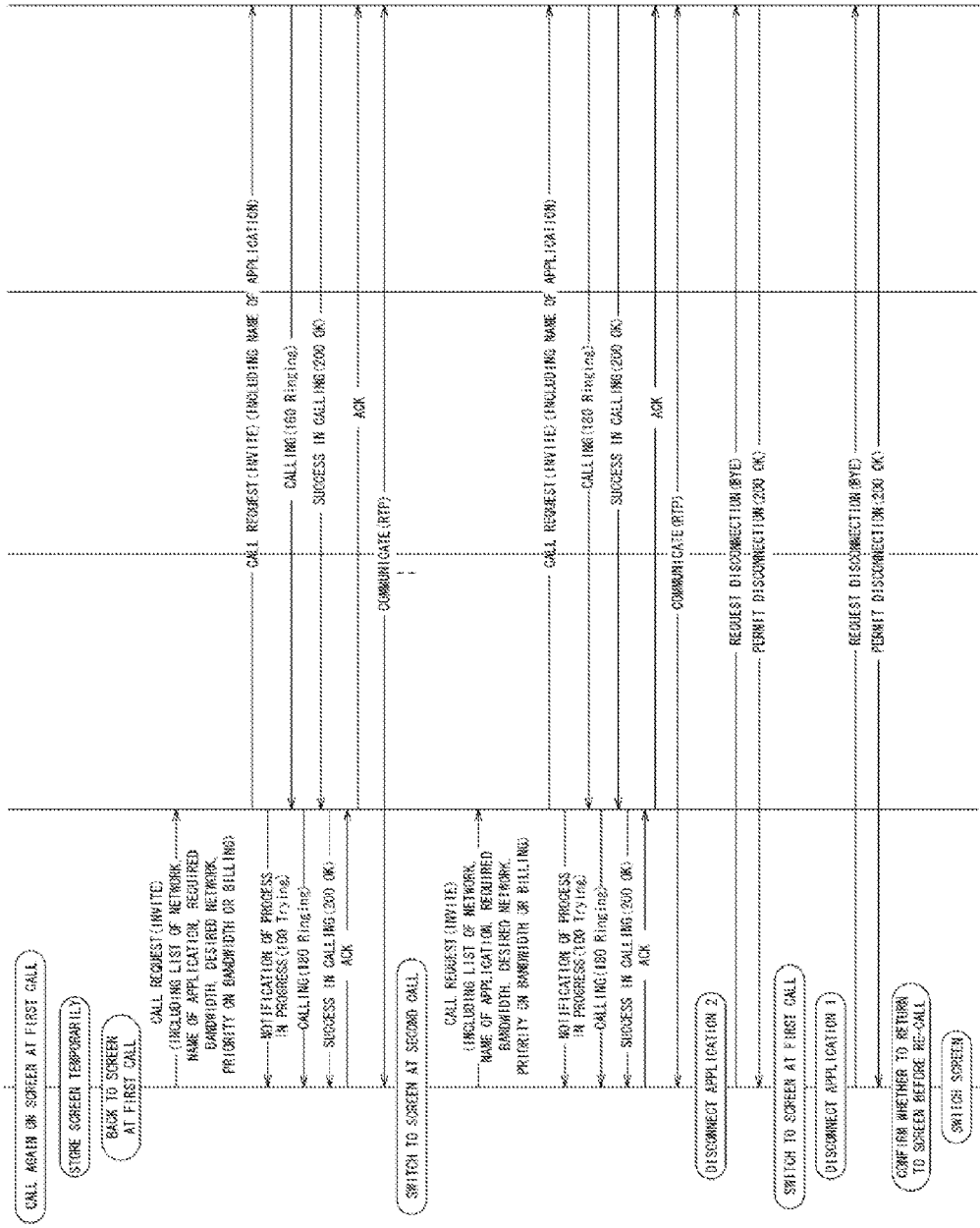
FIG. 27 is a sequence diagram illustrating a communication control (communication control 2) in the communication control method according to the first embodiment, performed when the wireless communication terminal of the calling side cancels a call to the wireless communication terminal of the called side, which is capable of connecting to the circuit switching network, then calls again to the called side when the called side becomes able to use the desired network, starts communication by use of the real-time application and then ends the communication.

FIG. 26 and FIG. 27 are sequence diagrams illustrating a communication control method according to the first embodiment and each of which illustrates communication control (communication control 2) performed when the wireless communication terminal of the calling side (origination terminal) UA100 cancels a call to the wireless communication terminal of the called side (destination terminal) UA200, which is capable of connecting to a circuit switching network, for the reason that the called side cannot use the desired network, thereafter calls again the called side since the called side becomes able to use the desired network, starts communication by use of the real-time application and then ends the communication. The communication control 2 differs from the above communication control 1 (see FIGS. 4 and 5) in a point where when the wireless communication terminal of the calling side (origination terminal) UA100 transmits the call enable notification request twice to the same destination (the wireless communication terminal of the called side (destination terminal) UA200) with the same desired network (wireless RNET2) and receives two call enable notifications at the same time, the origination terminal UA100, after calling again by use of the call enable notification selected, can return to the screen stored correspondingly to the call enable notification used to call again.

Specifically, as shown in the sequence diagram in FIG. 26, after calling (first call) by use of an application 1 (softphone shown in FIG. 28(a), for example), the origination terminal UA100 cancels the call for the reason that the destination terminal UA200 cannot use the desired network (RNET2) and transmits the call enable notification request (call enable notification request 1) to the destination terminal UA200. However, since there is no call enable notification transmitted from the destination terminal UA200, the origination terminal UA100 calls again (second call) by use of an application 2 (Whiteboard shown in FIG. 28(b), for example). Since the destination terminal UA200 still cannot use the desired network (wireless RNET2), the origination terminal UA100 cancels the second call and transmits the call enable notification request (call enable notification request 2) to the destination terminal UA200. The softphone is initiated in the screen state of the origination terminal UA100 at the first call as shown in FIG. 28(*a*), while Whiteboard is initiated in the screen state of the origination terminal UA100 at the second call as shown in FIG. 28(*b*).

Figure 29:
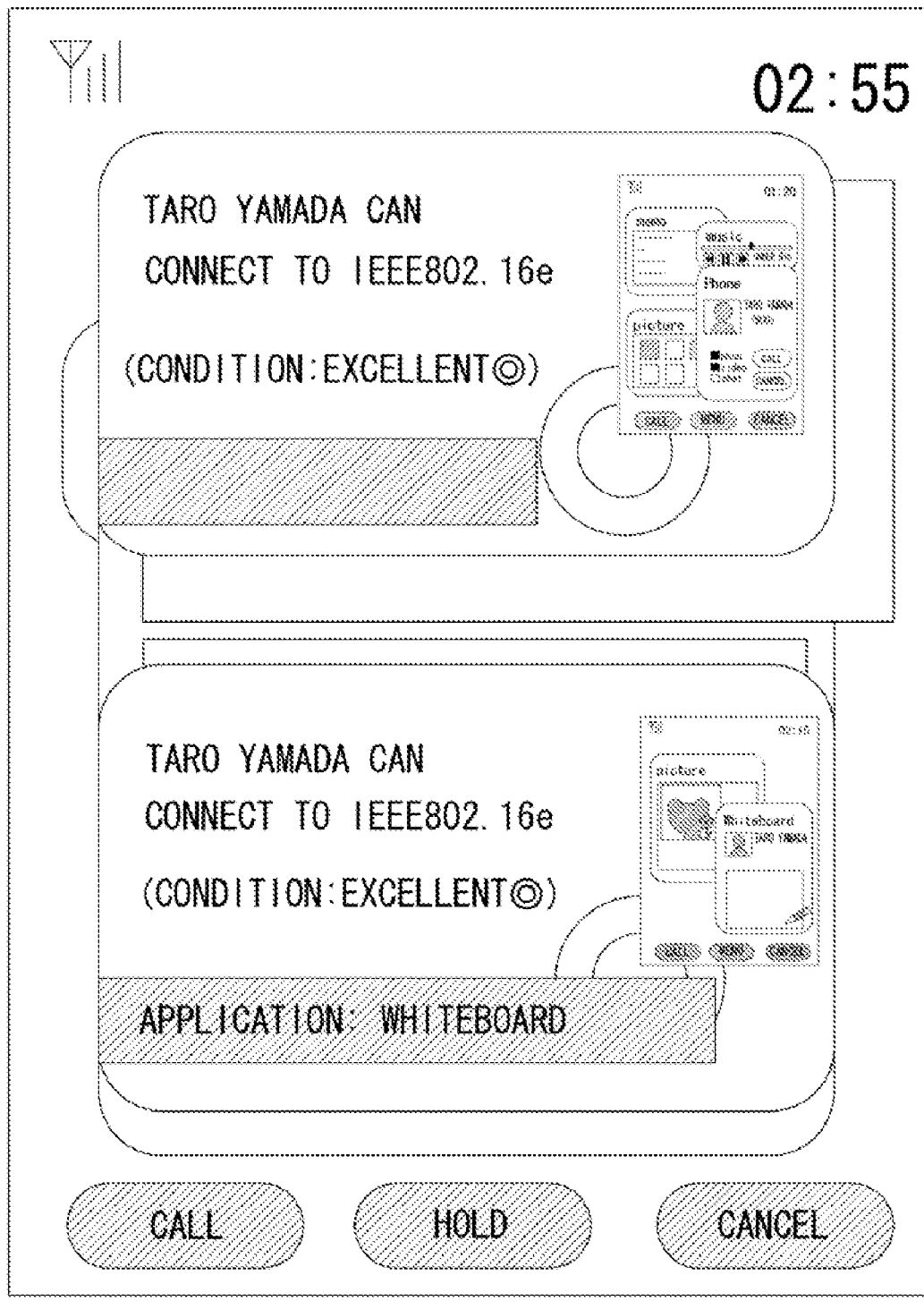
FIG. 29 is a diagram exemplifying a state in which all of the call enable notifications are displayed on a screen of the wireless communication terminal of the calling side, in the communication control method of the first embodiment.

In a case where the origination terminal UA100 receives a plurality of (two, in this case) call enable notifications at the same time in response to the call enable notification request transmitted twice, as shown in the sequence diagram in FIG. 26, since the destination terminal UA200 becomes able to use the desired network (wireless RNET2), the origination terminal UA100 shows all of the call enable notifications on the screen to notify the user that "the destination terminal UA200 becomes able to communicate on the desired network" as exemplified in FIG. 29 and requests the user to select the call enable notification to be used to call again. In a case the call enable notification corresponding to the first call is selected, as shown in the sequence diagram in FIG. 27, the origination terminal UA100 returns to the screen state at the first call which has been stored and starts calling the destination terminal UA200 to perform communication, while returning to the screen state at the second call which has been stored and starting calling the destination terminal UA200 to perform communication, in a case where the call enable notification corresponding to the second call is selected.

In a case where the destinations and the desired networks of the above two call enable notification requests are identical, the following screen display is performed so as to be able to switch to an unselected screen state after returning to a selected screen state. Specifically, in cases of the sequence diagrams in FIGS. 26, 27, in order to return to the unselected one of the screen states of FIGS. 28(*a*), 28(*b*), which have been stored, the origination terminal UA100 switches to one of the screen states of FIG. 30(*a*), 30(*b*) and displays it. In addition, in a case where different applications are used for transmission of the above two call enable notification requests, if the display is switched to the unselected screen state, a call is sent by use of the corresponding application as well, so that the origination terminal UA100 simultaneously communicates by use of both applications. By switchover of the screens, applications to be operated on the screen are changed.

When the user is using an application such as telephone or music which continues to run without an operation on the display, such an application is continuously used regardless of the switchover of the screen. Specifically, the softphone is used on the screen at the first call shown in FIG. 30(*a*), while Whiteboard, which is an application for performing an image editing together with a communication party, is used on the screen at the second call shown in FIG. 30(*b*). In such a case, when it is selected to call again by use of the softphone, which is the application 1, a re-call screen 1 is displayed as shown in FIG. 30(*a*) and a call is started by the softphone. Then, when a tab "02:15" on the screen is selected, the screen is switched to a re-call screen 2 as shown in FIG. 30(*b*), and a call is started by use of Whiteboard while the communication by the softphone is maintained.

In order to call a communication party by use of the real-time application, the origination terminal prepares the call by initiating and setting the application. For example, the origination terminal initiates the real-time application, selects a communication party and set a communication method and, moreover, prepares a file to send to the communication party or open the website which contains information the user of the origination terminal wishes to pass on. Accordingly, the origination terminal is often running applications and windows in relation to items which the user wishes to pass on to the communication party during communication, and it is thus possible for the user to pass on all items, which are intended to be passed on to the communication party at the first call, without a fail by changeover of the screens as set forth above.

Figure 31:
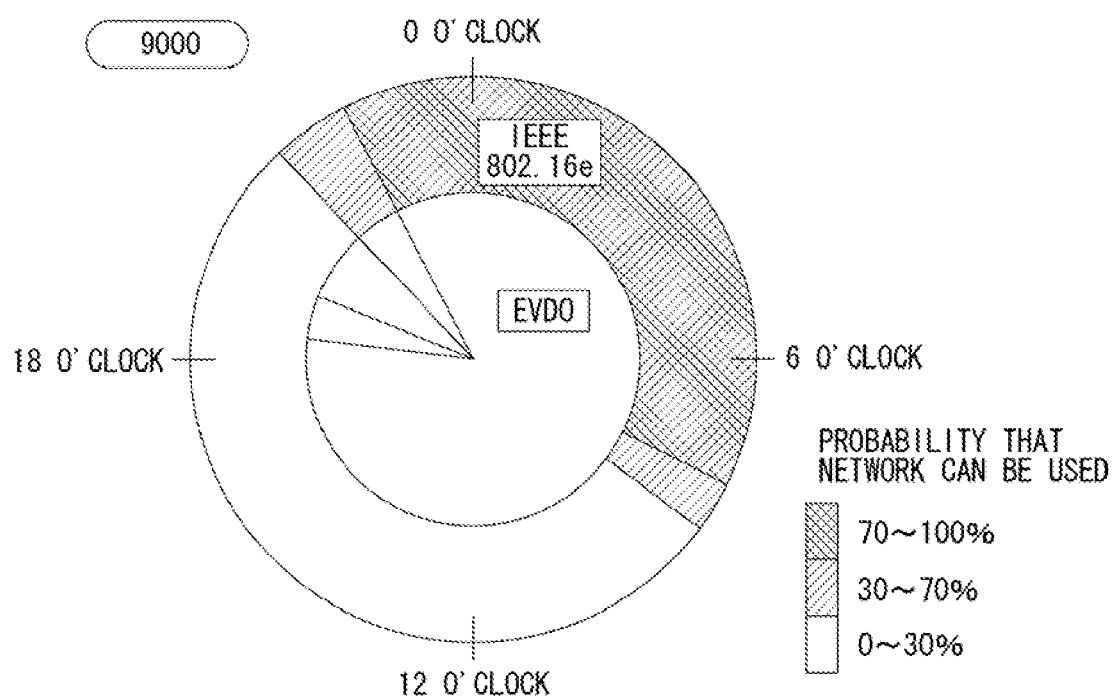
FIG. 31 is a graph exemplifying a condition when and at what probability the wireless communication terminal of the called side can connect to each network, in the communication control method according to the first embodiment.
Figure 33:
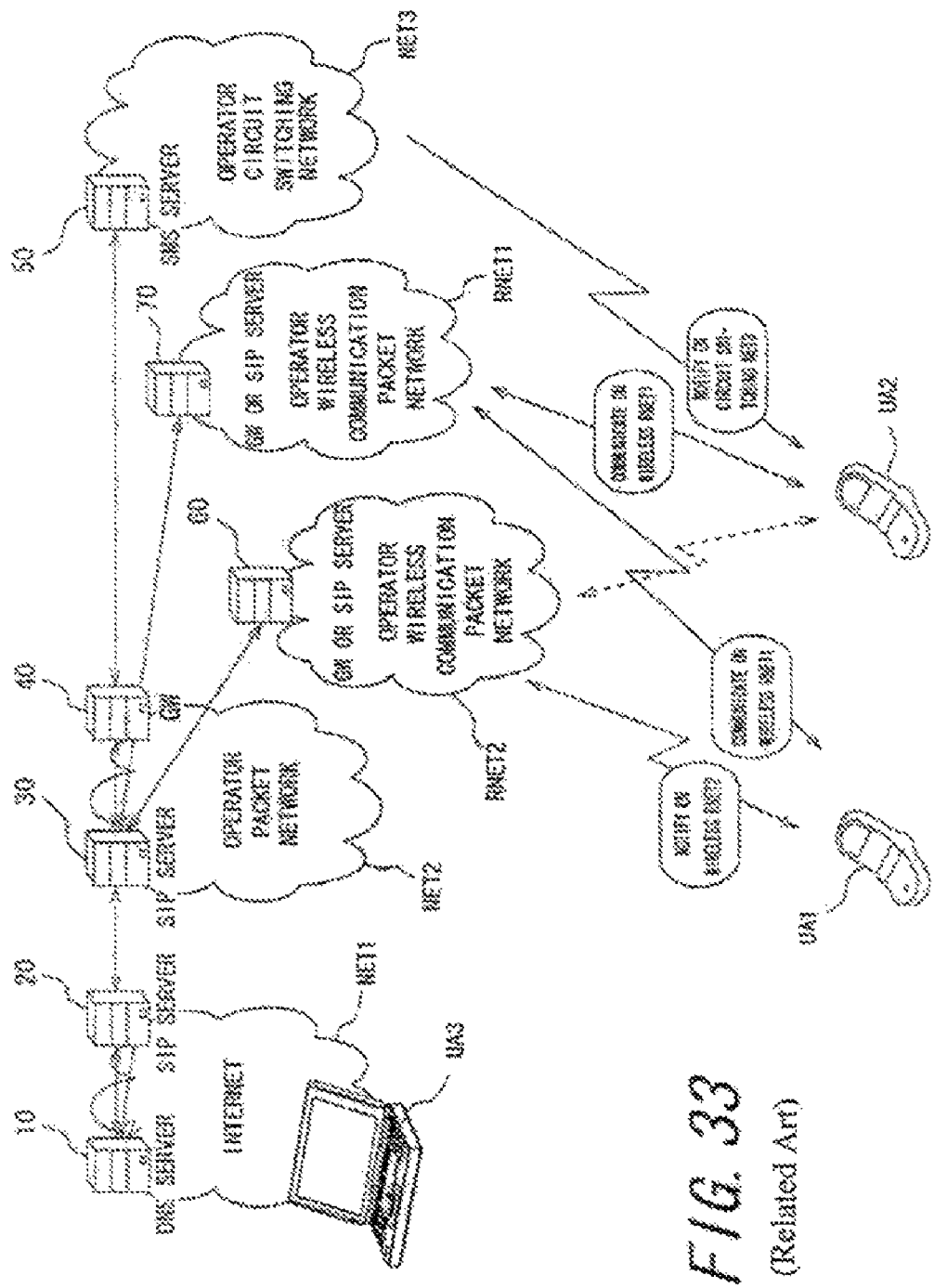
FIG. 33 is a diagram exemplifying a configuration of the wireless communication network of a conventional art.
Figure 34:
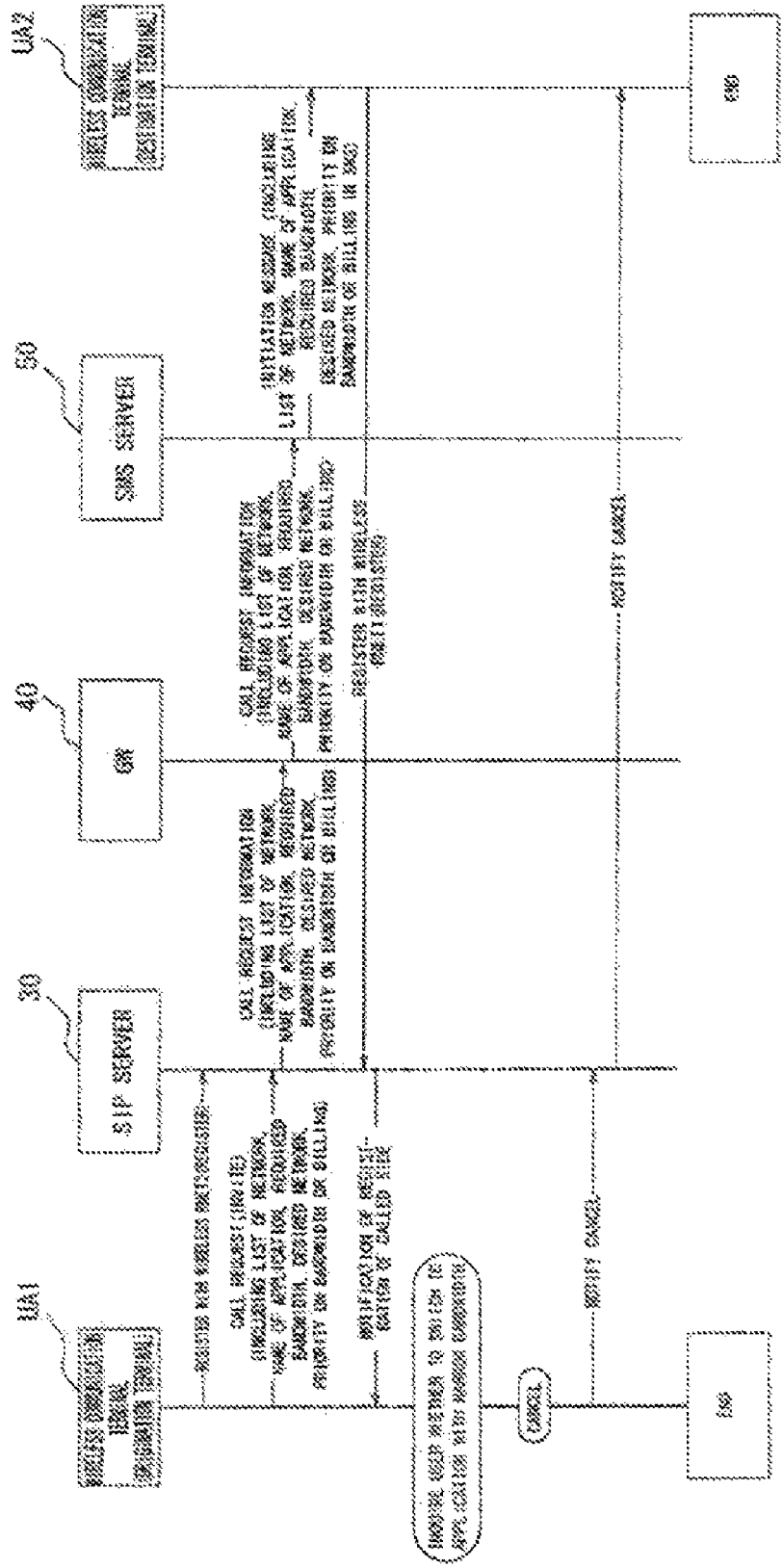
FIG. 34 is a sequence diagram showing the communication control until a communication starts between the wireless communication terminal of the calling side and the wireless communication terminal of the called side on the wireless communication network of the conventional art.

The communication control method 1 of FIGS. 4 and 5 and the communication control method 2 of FIGS. 26 and 27 display a graph exemplified in FIG. 31 to show when and at what probability the destination terminal can connect to each network. Specifically, the origination terminal UA100 records about when each destination terminal, to which the origination terminal UA100 has transmitted the call enable notification request, can/cannot use the desired network in "a record of connection state of the terminal of the called side" exemplified in FIG. 32 and create a statistical graph as shown in FIG. 31 for each destination terminal to display.

According to the communication control method according to the first embodiment of the present invention (the communication control method 1 of FIGS. 4 and 5 and the communication control method 2 of FIGS. 26 and 27), when the user of the origination terminal (wireless communication terminal of the calling side) UA100 cancels the first call for the reason that the destination terminal (wireless communication terminal of the called side) UA200, capable of using a plurality of wireless communication systems (RNET1, RNET2), cannot use the network desired by the calling side, and then the destination terminal UA200 becomes to use the desired network, origination terminal UA100 returns to the screen state which is stored at the first call after receiving the call enable notification from the destination terminal UA200 and calling again. It is thus possible for the user to know when to call so as to connect to the called side on the desired network. Moreover, it is possible to reduce procedures of the user of the calling side to call again.

The invention claimed is:

1. A communication apparatus comprising: a transmission unit for transmitting a call request including information on a condition of a wireless communication system of a called side desired by a calling side by use of a predetermined communication system; a memory unit for storing a screen state of a display unit at transmission of the call request and an initiation state of an application corresponding to the screen state; a request unit for requesting the called side, when receiving information that the called side uses a wireless communication system not satisfying the condition of the wireless communication system of the called side desired by the calling side in response to the call request transmitted by the transmission unit, to transmit a call enable notification, when the called side can connect to a wireless communication system satisfying the condition of the wireless communication system of the called side desired by the calling side, to notify the calling side accordingly; and a control unit for controlling the display unit, when receiving the call enable notification from the called side in response to the request by the request unit, to display the screen state stored in the memory unit and, when detecting a call instruction in the screen state, an application corresponding to the call instruction to send a call.

2. The communication apparatus according to claim 1, wherein the control unit, in a case where the memory unit stores a plurality of screen states of the display unit at transmission of the call request, controls the display unit to display all of the screen states at once and, when detecting a selection instruction selecting one of the screen states, to display only a display screen corresponding to the selection instruction and, in such a state, controls an application corresponding to the display screen to send a call.

3. The communication apparatus according to claim 1, wherein the control unit, in a case where the memory unit temporarily stores a screen state of the display unit before reception of the call enable notification and an initiation state of an application corresponding to the screen state, controls the display unit to display the screen state temporarily stored in the memory unit when detecting a screen return instruction after sending the call in response to the call instruction.

4. A communication control method comprising: a transmission step for transmitting a call request including information on a condition of a wireless communication system of a called side desired by a calling side by use of a predetermined communication system; a memory step for storing a screen state of a display unit at transmission of the call request and an initiation state of an application corresponding to the screen state; a request step for requesting the called side, when receiving information that the called side uses a wireless communication system not satisfying the condition of the wireless communication system of the called side desired by the calling side in response to the call request transmitted at the transmission step, to transmit a call enable notification, when the called side can connect to a wireless communication system satisfying the condition of the wireless communication system of the called side desired by the calling side, to notify the calling side accordingly; and a control step for controlling the display unit, when receiving the call enable notification from the called side in response to the request at the request step, to display the screen state stored at the memory step and, when detecting a call instruction in the screen state, an application corresponding to the call instruction to send a call.

* * * * *